US008736521B2

(12) United States Patent
Yamashita et al.

(10) Patent No.: US 8,736,521 B2
(45) Date of Patent: May 27, 2014

(54) DISPLAY DEVICE AND ELECTRONIC APPARATUS HAVE THE SAME

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 12/285,869

(22) Filed: Oct. 15, 2008

(65) Prior Publication Data

US 2009/0102760 A1 Apr. 23, 2009

(30) Foreign Application Priority Data

Oct. 23, 2007 (JP) ................................ 2007-274753

(51) Int. Cl.

| | |
|---|---|
| ***G09G 3/30*** | (2006.01) |
| ***G09G 3/32*** | (2006.01) |
| ***G09G 5/00*** | (2006.01) |
| ***G06F 3/038*** | (2013.01) |
| ***G09G 3/10*** | (2006.01) |

(52) U.S. Cl.

USPC .................. 345/76; 345/77; 345/80; 345/82; 345/204; 345/211; 315/169.1; 315/169.3

(58) Field of Classification Search

USPC ........................................................ 345/76

See application file for complete search history.

(56) References Cited

U.S. PATENT DOCUMENTS

| | | | | |
|---|---|---|---|---|
| 7,847,762 B2 * | 12/2010 | Iida et al. | | 345/76 |
| 2004/0252089 A1 | 12/2004 | Ono et al. | | |
| 2005/0280616 A1 | 12/2005 | Miwa et al. | | |
| 2006/0097966 A1 * | 5/2006 | Choi | | 345/77 |
| 2007/0176859 A1 | 8/2007 | Cok et al. | | |
| 2007/0176862 A1 * | 8/2007 | Kurt et al. | | 345/82 |

FOREIGN PATENT DOCUMENTS

| | | |
|---|---|---|
| JP | 2002-149112 A | 5/2002 |
| JP | 2002-149112 * | 12/2002 |
| JP | 2003-271095 A | 9/2003 |
| JP | 2004-126439 A | 4/2004 |
| JP | 2004-341359 A | 12/2004 |
| JP | 2006-003744 A | 1/2006 |
| JP | 2006-053539 A | 2/2006 |
| JP | 2006-215213 * | 8/2006 |
| JP | 2007-148129 * | 6/2007 |

(Continued)

OTHER PUBLICATIONS

Japanese Office Action issued Sep. 15, 2009 for corresponding Japanese Application No. 2007-274753.

(Continued)

*Primary Examiner* — Sumati Lefkowitz
*Assistant Examiner* — Andrew Yeretsky
(74) *Attorney, Agent, or Firm* — Rader, Fishman & Grauer PLLC

(57) ABSTRACT

A display device includes a pixel array portion in which sub-pixels each including an electro-optic element, a write transistor for writing a video signal, a hold capacitor for holding the video signal written by the write transistor, and a drive transistor for driving the electro-optic element in accordance with the video signal held in the hold capacitor are disposed in a matrix, and each unit pixel is composed of the plurality of adjacent sub-pixels belonging to a plurality of rows. The display device further includes power source supply lines through which power source potentials different in potential from one another are selectively supplied to the drive transistors. One power source supply line is wired every plural rows.

8 Claims, 18 Drawing Sheets

(56) References Cited

FOREIGN PATENT DOCUMENTS

| | | | |
|---|---|---|---|
| JP | 2007-148129 | A | 6/2007 |
| JP | 2007-171828 | A | 7/2007 |
| JP | 2007-310311 | A | 11/2007 |
| JP | 2009-524910 | A | 7/2009 |
| WO | WO2007/089506 | * | 8/2007 |
| WO | WO-2007/089506 | A1 | 8/2007 |

OTHER PUBLICATIONS

Japanese Office Action issued Feb. 7, 2012 for related Japanese Application No. 2009-241122.

* cited by examiner t=t BEFORE t1 t=t1 t=t2 t=t3

DISPLAY DEVICE AND ELECTRONIC APPARATUS HAVE THE SAME

CROSS REFERENCES TO RELATED APPLICATIONS

The present invention contains subject matter related to Japanese Patent Application JP 2007-274753 filed in the Japan Patent Office on Oct. 23, 2007, the entire contents of which being incorporated herein by reference.

BACKGROUND OF THE INVENTION

1. Field of the Invention

The present invention relates to a display device and an electronic apparatus having the same, and more particularly to a flat panel type display device in which pixels each including an electro-optic element are disposed in a matrix, and an electronic apparatus having the same.

2. Description of Related Art

In recent years, a flat panel type display device in which pixels (pixel circuits) each including a light emitting element are disposed in a matrix has rapidly spread in the field of display devices for displaying images. A flat panel type display device using a so-called current driven type electro-optic elements each showing an emission luminance which changes depending on a value of a current flowing through a device, for example, an electro luminescence (EL) display device using an organic EL element utilizing such a phenomenon that application of an electric field across an organic thin film causes the organic thin film to emit a light has been developed and advanced in its commercialization.

The organic EL display device has the following characteristics. That is to say, the power consumption is low because the organic EL element can be driven by using an applied voltage of 10 V or less. In addition, as compared with a liquid crystal display device for displaying an image by controlling an intensity of a light from a light source (backlight) in a liquid crystal cell each pixel including the liquid crystal cell, the high visibility for an image is obtained because the organic EL element is a self-light emitting element. Moreover, the weight-lightening and the thinning are readily realized because the organic EL display device does not require an illuminating device such as the backlight essential to the liquid crystal display device. Furthermore, no afterimage in the phase of displaying a moving image occurs because the organic EL display device has a very high response speed of about several microseconds.

The organic EL display device can adopt a passive matrix system and an active matrix system as a drive system thereof similarly to the case of the liquid crystal display device. However, although the display device adopting the passive matrix system has a simple structure, it involves such a problem that it is difficult to realize the large and high-definition display device because a time period for light emission of the electro-optic element decreases due to an increase in number of scanning lines (that is, in number of pixels), and so forth.

For this reason, in recent years, the display device adopting the active matrix system has been actively developed in which a current caused to flow through an electro-optic element is controlled by an active element provided in the same pixel circuit as that of the electro-optic element, for example, an insulated gate field-effect transistor (in general, a thin film transistor (TFT)). It is easy to realize the large and high-definition display device because the electro-optic element continues to emit a light over a time period of one frame in the display device adopting the active matrix system.

Now, it is generally known that current-voltage characteristics (I-V characteristics) of the organic EL element deteriorate with time (deterioration with time). In the pixel circuit using an N-channel TFT as a transistor for current-driving the organic EL element (hereinafter referred to as "a drive transistor"), the organic EL element is connected to a source side of the drive transistor. Therefore, when the I-V characteristics of the organic EL element deteriorate with time, a gate-to-source voltage Vgs of the drive transistor changes follows the deterioration with time, and as a result, an emission luminance of the organic EL element also changes.

This situation will now be concretely described. A source potential of the drive transistor depends on an operating point between the drive transistor concerned and the organic EL element. Also, when the I-V characteristics of the organic EL element deteriorate with time, the operating point between the drive transistor and the organic EL element fluctuates. Thus, even when the same voltage as that before the deterioration with time is applied to a gate of the drive transistor, the source potential of the drive transistor changes. As a result, since the gate-to-source voltage Vgs of the drive transistor changes, the value of the current flowing through the drive transistor concerned changes. This results in that the emission luminance of the organic EL element changes because the value of the current flowing through the organic EL element also changes.

In addition, in the pixel circuit using a polysilicon TFT, in addition to the deterioration with time of the I-V characteristics of the organic EL element, a threshold voltage Vth of the drive transistor, and a mobility $\mu$ of a semiconductor thin film having a channel of the drive transistor formed therein (hereinafter referred to as "a mobility of the drive transistor") $\mu$ change with time. Also, the threshold voltage Vth and the mobility $\mu$ differs each pixel due to the dispersion in the manufacturing processes (there is the dispersion in the individual transistor characteristics).

When the threshold voltage Vth and the mobility $\mu$ of the drive transistor differs each pixel, the dispersion occurs in the value of the current flowing through the drive transistor each pixel. Thus, even when the voltages which are identical to one another among the pixels are applied to the gates of the drive transistors, respectively, the dispersion occurs in the emission luminance of the organic EL elements of the pixels. As a result, the uniformity of the picture is impaired.

Then, even when the I-V characteristics of the organic EL element deteriorate with time, or the threshold voltage Vth and the mobility $\mu$ of the drive transistor changes with time, it is necessary to hold the emission luminance of the organic EL element constant without receiving the influences of them. In order to attain this situation, there is adopted such a constitution for giving each of the individual pixel circuits correction functions such as a compensation function for the fluctuation of the characteristics of the organic EL element, a correction for the fluctuation of the threshold voltage Vth of the drive transistor (hereinafter referred to as "a threshold correction"), and a correction for the fluctuation of the mobility $\mu$ of the drive transistor (hereinafter referred to as "a mobility correction"). This technique, for example, is described in Japanese Patent Laid-Open No. 2006-215213 (hereinafter referred to as Patent Document 1).

SUMMARY OF THE INVENTION

With the related art described in Patent Document 1, each of the pixel circuits is given the compensation function for the fluctuation of the characteristics of the organic EL element, the correction function for the fluctuation of the threshold voltage Vth of the drive transistor, and the correction function for the fluctuation of the mobility μ of the drive transistor. As a result, even when the I-V characteristics of the organic EL element change with time, or the threshold voltage Vth and the mobility μ of the drive transistor change with time, the emission luminance of the organic EL element can be held constant without receiving the influences of them. However, on the other hand, the number of elements constituting the pixel circuit is large, which impedes the miniaturization of the pixel size.

On the other hand, in order to reduce the number of elements and wirings constituting the pixel circuit, for example, it is expected to adopt a configuration with which a power source potential supplied to the drive transistor of the pixel circuit is made switchable. In this case, it is also expected to adopt a technique with which the drive transistor is given a function of controlling a time period for light emission/a time period for non-light emission of the organic EL element by switching the power source potential, thereby eliminating a dedicated transistor for controlling the light emission/the non-light emission.

By adopting such a technique, the pixel circuit can be configured with necessary minimum two transistors of a write transistor and a drive transistor (except for a capacitor element) (its details will be described later). In this case, the write transistor samples a video signal and writes the video signal thus sampled to the pixel. Also, the drive transistor drives the organic EL element in accordance with the video signal written to the pixel by the write transistor.

Now, as shown in FIG. 19, in a display device adopting a color display system, a unit pixel (one pixel) 300*a* is generally composed of adjacent sub-pixels 301R, 301G and 301B which correspond to the three primary colors of R (red), G (green) and B (blue), respectively, and which belong to the same row.

On the other hand, in order to realize the high luminance promotion and the low power consumption promotion, as shown in FIG. 20, in addition to the sub-pixels 301R, 301G and 301B corresponding to the three primary colors of R, G and B, respectively, a sub-pixel 301W corresponding to white (W) having a high frequency in use is used in some cases. In such cases, a unit pixel 300*b* is composed of the four kinds of sub-pixels 301W, 301R, 301G, and 301B corresponding to W, R, G, and B, respectively.

When the unit pixel 300*b* is composed of the four kinds of sub-pixels 301W, 301R, 301G and 301B in the manner described above, in general, as shown in FIG. 20, the square sub-pixels 301W, 301R, 301G, and 301B are laid out equally in a vertical direction and in a horizontal direction over a plurality of rows, for example, over two rows. In this case, the number of signal lines per unit pixel can be reduced from three lines in the case of the display device using R, G and B to two lines.

However, the unit pixel 300*b* is configured in units of two rows. Thus, when there is adopted the pixel configuration adapted to give the drive transistor the function of controlling the time period for light emission/the time period for non-light emission of the organic EL element, the number of power source supply lines through which the power source potential is supplied to the drive transistor needs to be double that in the case of the display device using R, G and B.

When the number of power source supply lines is doubled, the degree of the high definition of the pixel is reduced because the power source supply lines have a large rate of occupation in the pixel area. In addition, when the number of power source supply lines is doubled, the number of stages of power source supply scanning circuits for driving the power source supply lines is also doubled. As a result, the circuit scale of the power source supply scanning circuits increases, thereby making it difficult to narrow a frame of a peripheral portion, of a pixel array portion, which is referred to as a so-called screen frame on a display panel.

In the light of the foregoing, it is therefore desirable to provide a display device which is capable of allowing high-definition promotion and narrowing of a screen frame of a display panel in the case where there is adopted such a configuration that a unit pixel is composed of a plurality of adjacent sub-pixels belonging to a plurality of rows, and a drive transistor is given a function of controlling a time period for light emission/a time period for non-light emission, and an electronic apparatus having the same.

In order to attain the desire described above, according to an embodiment of the present invention, there is provided a display device, including: a pixel array portion in which sub-pixels each including an electro-optic element, a write transistor for writing a video signal, a hold capacitor for holding therein the video signal written thereto by the write transistor, and a drive transistor for driving the electro-optic element in accordance with the video signal held in the hold capacitor are disposed in a matrix, and each unit pixel is composed of the plurality of adjacent sub-pixels belonging to a plurality of rows; and power source supply lines through which power source potentials different in potential from one another are selectively supplied to the drive transistors; in which one power source supply line is wired every plural rows.

According to another embodiment of the present invention, there is provided an electronic apparatus having a display device including: a pixel array portion in which sub-pixels each including an electro-optic element, a write transistor for writing a video signal, a hold capacitor for holding therein the video signal written thereto by the write transistor, and a drive transistor for driving the electro-optic element in accordance with the video signal held in the hold capacitor are disposed in a matrix, and each unit pixel is composed of the plurality of adjacent sub-pixels belonging to a plurality of rows; and power source supply lines through which power source potentials different in potential from one another are selectively supplied to the drive transistors; in which one power source supply line is wired every plural rows.

In the display device having the configuration described above, and the electronic apparatus having the same, one power source supply line is made common to the plurality of adjacent sub-pixels constituting the same unit pixel and belonging to the plurality of rows. As a result, when the plurality of rows, for example, are two rows, that is, when the unit pixel is configured in units of two rows, it is possible to prevent occurrence of the case where the number of power source supply lines need to be doubled. In addition, the circuit configuration of the power source supply scanning circuit for driving the power source supply lines can be held as it is. As a result, it is possible to narrow the screen frame of the display panel. In addition, it is possible to realize the promotion of the high definition of the display panel because the size of each of the sub-pixels can be reduced.

According to the present invention, one power source supply line is wired every plural rows (every pixel) in the case where there is adopted such a configuration that the unit pixel is composed of a plurality of adjacent sub-pixels belonging to a plurality of rows, and the drive transistor is given the function of controlling a time period for light emission/a time period for non-light emission. As a result, it is possible to realize the promotion of the high definition and the narrowing of the screen frame of the display panel.

DETAILED DESCRIPTION OF THE PREFERRED EMBODIMENTS

Hereinafter, an embodiment of the present invention will be described in detail with reference to the accompanying drawings.

[Organic EL Display Device of Reference Example]

Firstly, in order to facilitate the understanding of the present invention, an active matrix type display device becoming the premise of an embodiment of the present invention will now be described as a reference example. The active matrix type display device according to the reference example is a display device which was proposed in Japanese Patent No. 2006-141836 by the applicant of this patent application.

Figure 1:
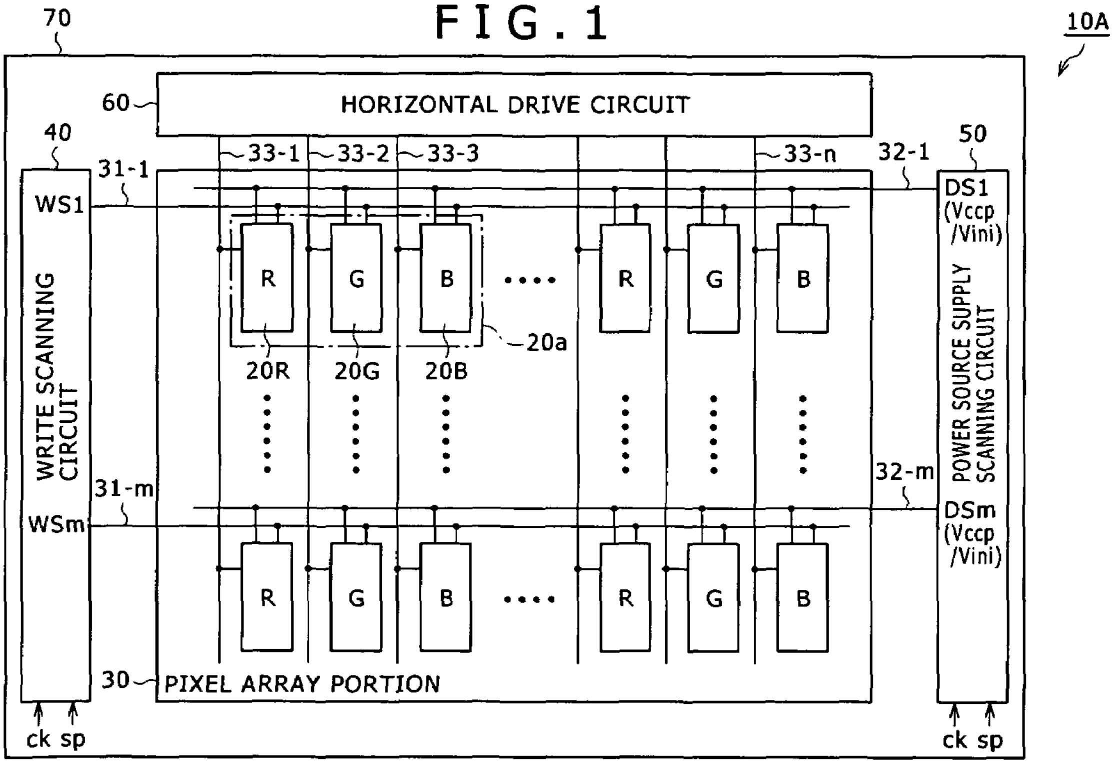
FIG. 1 is a system configuration schematically showing a configuration of an organic EL display device according to a reference example of the present invention.

FIG. 1 is a system configuration schematically showing a configuration of the active matrix type display device according to the reference example. In this case, an active matrix type organic EL display device using a current driven type electro-optic element showing an emission luminance which changes depending on a value of a current flowing through a device, for example, an organic electro luminescence (EL) element as a light emitting element of a sub-pixel.

As shown in FIG. 1, an organic EL display device 10A according to the reference example has a system configuration including a pixel array portion 30 and a drive portion. In this case, unit pixels 20*a* each of which is composed of adjacent sub-pixels 20R, 20G and 20B corresponding to the three primary colors of R, G and B, and belonging to the same row are two-dimensionally disposed in a matrix in the pixel array portion 30. The drive portion is disposed in a peripheral portion (screen frame) of the pixel array portion 30, and drives the unit pixels 20*a*. A write scanning circuit 40, a power source supply scanning circuit 50 and a horizontal drive circuit 60, for example, are provided as the drive portion for driving the unit pixels 20*a*.

For the sub-pixel disposition having m rows and n columns, in the pixel array portion 30, scanning lines 31-1 to 31-*m*, and power source supply lines 32-1 to 32-*m* are wired so as to correspond to the m rows, respectively, and signal lines 33-1 to 33-*n* are wired so as to correspond to the n columns, respectively.

The pixel array portion 30 is normally formed on a transparent insulating substrate such as a glass substrate, and thus has a flat panel type structure. Each of sub-pixels 20R, 20G and 20B of the pixel array portion 30 can be formed in the form of either an amorphous silicon thin film transistor (TFT) or a low temperature TFT. When each of the sub-pixels 20R, 20G and 20B of the pixel array portion 30 is formed in the form of the low temperature TFT, the write scanning circuit 40, the power source supply scanning circuit 50, and the horizontal drive circuit 60 can also be mounted onto a display panel (substrate) 70 on which the pixel array portion 30 is formed.

The write scanning circuit 40 is composed of a shift register for shifting (transferring) a start pulse sp in synchronization with a clock pulse ck, or the like. Also, when the video signals are written to the sub-pixels 20R, 20G and 20B of the pixel array portion 30, respectively, the write scanning circuit 40 successively supplies scanning signals WS1 to WSm to the scanning lines 31-1 to 31-*m*, respectively, thereby scanning the sub-pixels 20R, 20G and 20B in order in units of rows (line-sequential scanning).

The power source supply scanning circuit 50 is composed of a shift register for shifting (transferring) the start pulse sp in synchronization with the clock pulse ck, or the like. Also, the power source supply scanning circuit 50 supplies power source supply line potentials DS1 to DSm each of which is adapted to be switched between a first potential Vccp and a second potential Vini lower than the first potential Vccp, synchronously with the line-sequential scanning made by the write scanning circuit 40, thereby controlling light emission/non-light emission of each of the sub-pixels 20R, 20G and 20B.

That is to say, each of the power source line potentials DS1 to DSm on the respective power source supply lines 32-1 to 32-*m* has a function as a light emission controlling signal which the light emission/non-light emission of each of the sub-pixels 20R, 20G and 20B is controlled. In addition, the power source supply scanning circuit 50 has a function as a light emission drive scanning circuit for controlling light emission drive for each of the sub-pixels 20R, 20G and 20B.

The horizontal drive circuit 60 suitably selects one from a signal voltage Vsig of the video signal corresponding to luminance information supplied from a signal supply source (not shown) (hereinafter simply referred to as “a signal voltage” when applicable), and an offset voltage Vofs. Also, the horizontal drive circuit 60 writes the signal voltage Vsig or offset voltage Vofs thus selected to the sub-pixels 20R, 20G and 20B of the pixel array portion 30 through the signal lines 33-1 to 33-*n*, respectively, in units of rows (lines). That is to say, the horizontal drive circuit 60 is a signal supplying portion adopting a line-sequential write drive form of writing the signal voltage Vsig of the video signal in units of lines.

Here, the offset voltage Vofs is a reference voltage (for example, a voltage corresponding to a black level) as a reference for the signal voltage Vsig of the video signal. In addition, the second potential Vini is set as a lower potential than the offset voltage Vofs, for example, as a lower potential than (Vofs−Vth) where Vth is a threshold voltage of the drive transistor 22, preferably, as a potential sufficiently lower than (Vofs−Vth).

(Pixel Circuit of Sub-Pixel)

Figure 2:
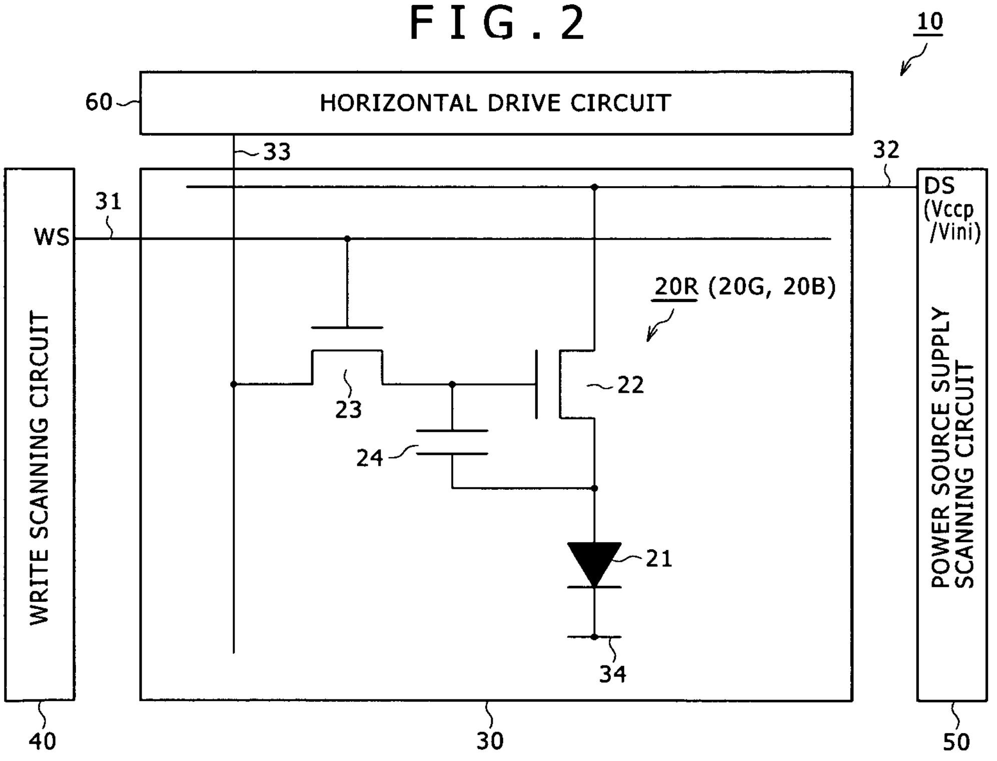
FIG. 2 is a circuit diagram showing an example of a circuit configuration of a pixel (pixel circuit)

FIG. 2 is a circuit diagram showing a concrete configuration example of a pixel circuit of each of the sub-pixels 20R, 20G and 20B in the organic EL display device 10A according to the reference example.

As shown in FIG. 2, each of the sub-pixels 20R, 20G, and 20B includes a current driven type electro-optic element showing an emission luminance which changes depending on a value of a current flowing through the device, for example, an organic EL element 21 as a light emitting element. Also, each of the sub-pixels 20R, 20G and 20B has a pixel configuration of having a drive transistor 22, a write transistor 23, and a hold capacitor 24 in addition to the organic EL element 21.

Here, N-channel TFTs are used as the drive transistor 22 and the write transistor 23, respectively. However, a combination of conduction types of the drive transistor 22 and the write transistor 23 is merely an example, and thus the present invention is by no means limited thereto.

The organic EL element 21 is connected in a cathode electrode thereof to a common power source supply line 34 which is wired commonly to all the sub-pixels 20R, 20G and 20B. The drive transistor 22 is connected in a source electrode thereof to an anode electrode of the organic EL element 21, and is connected in a drain electrode thereof to a power source supply line 32 (corresponding one of 32-1 to 32-*m*).

A gate electrode of the write transistor 23 is connected to the scanning line 31 (corresponding one of 31-1 to 31-*m*). Also, one electrode (source electrode/drain electrode) of the write transistor 23 is connected to the signal line 33 (corresponding one of 33-1 to 33-*n*), and the other electrode (source electrode/drain electrode) is connected to a gate electrode of the drive transistor 22.

One electrode of the hold capacitor 24 is connected to the gate electrode of the drive transistor 22, and the other electrode is connected to the source electrode (the anode electrode of the organic EL electrode 21) of the drive transistor 22. Note that, a configuration that a subsidiary capacitor is connected between the anode electrode of the organic EL element 21 and a portion having a fixed potential, thereby taking up a shortage of the capacitance in the organic EL element 21 is adopted in some cases.

In each of the sub-pixels 20R, 20G and 20B having the configuration described above, the write transistor 23 becomes a conduction state in response to the write scanning signal WS which is applied from the scanning circuit 40 to the gate electrode thereof through the scanning line 31. As a result, the write transistor 23 samples either the signal voltage Vsig of the video signal corresponding to the luminance information supplied thereto from a horizontal drive circuit 60 through the signal line 33, or the offset voltage Vofs, and writes the signal voltage Vsig or offset Vofs thus sampled to the sub-pixel 20R (20G and 20B).

The signal voltage Vsig or offset Vofs thus written is applied to the gate electrode of the drive transistor 22, and is also held in the hold capacitor 24. While a potential DS on the power source supply line 32 (corresponding one of 32-1 to 32-*m*) is held at the first potential Vccp, the drive transistor 22 supplies the drive current having a current value corresponding to the voltage value of the signal voltage Vsig held in the hold capacitor 24 to the organic EL element 21 by receiving supply of the current from the current source supply line 32. Thus, the drive transistor 22 current-drives the organic EL element 21, thereby causing the organic EL element 21 to emit a light.

(Structure of Sub-Pixel)

Figure 3:
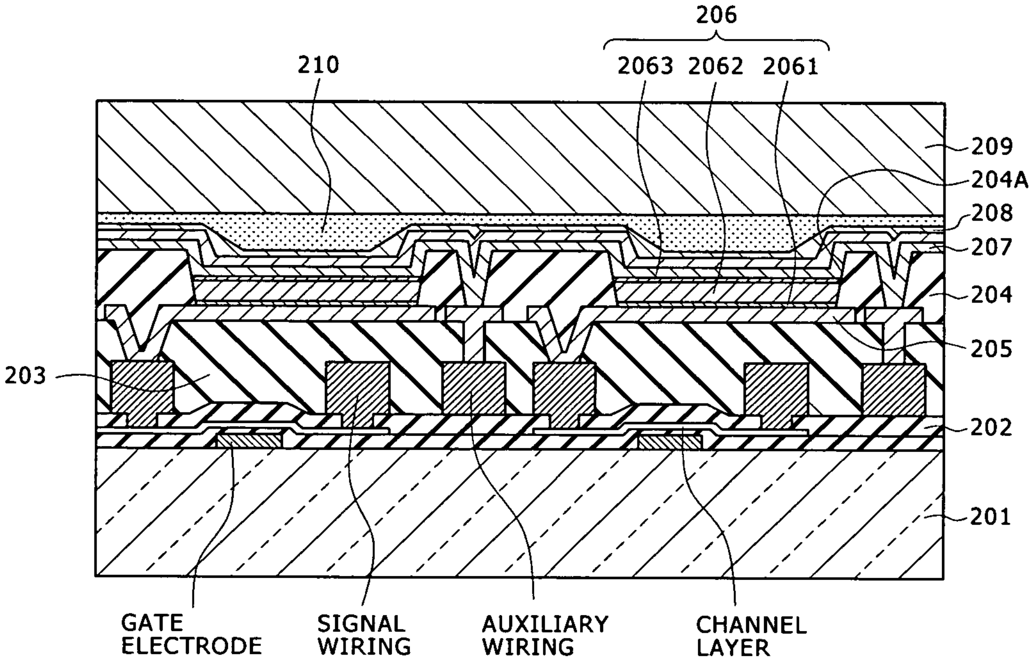
FIG. 3 is a cross sectional view showing an example of a cross sectional structure of the pixel.

FIG. 3 is a cross sectional view showing an example of a cross sectional structure of the sub-pixel 20R (20G and 20B). As shown in FIG. 3, the sub-pixel 20R (20G and 20B) has the following structure. That is to say, an insulating film 202, an insulating planarizing film 203 and a window insulating film 204 are formed in order on a glass substrate 201 on which the pixel circuit composed of the drive transistor 22, the write transistor 23, and the like is formed. Also, the organic EL element 21 is provided in a recess portion 204A of the window insulating film 204.

The organic EL element 21 is composed of an anode electrode 205, an organic layer (including an electron transporting layer, a light emitting layer, and a hole transporting layer/a hole injecting layer) 206, and a cathode electrode 207. In this case, the anode electrode 205 is made of a metal or the like and is formed on a bottom portion of the recess portion 204A of the window insulating film 204. The organic layer 206 is formed on the anode electrode 205. Also, the cathode electrode 207 is made of a transparent conductive film or the like and is formed on the organic layer 206 commonly to all the pixels.

In the organic EL element 21, the organic layer 206 is formed by depositing the hole transporting layer/the hole injecting layer 2061, the light emitting layer 2062, the electron transporting layer 2063, and an electron injecting layer (not shown) in order on the anode electrode 205. Also, a current is caused to flow from the drive transistor 22 to the organic layer 206 through the anode electrode 205 under the current drive made by the drive transistor 22 shown in FIG. 2, which results in that the electrons and holes are re-combined with each other in the light emitting layer 2062 within the organic layer 206, thereby emitting a light.

As shown in FIG. 3, the organic EL element 21 is formed above the glass substrate 201 having the pixel circuit formed thereon through the insulating film 202, the insulating planarizing film 203, and the window insulating film 204 in units of sub-pixels. After that, a sealing substrate 209 is bonded to the substrate body through a passivation film 208 by using an adhesive agent 210 to seal the organic EL element 21 with the sealing substrate 209, thereby forming the display panel 70.

(Circuit Operation of Organic EL Display Device of Reference Example)

Next, a basic circuit operation of the organic EL display device 10A according to the reference example will be described based on a timing waveform chart of FIG. 4 with reference to operation explanatory diagrams of FIGS. 5A to 5H. It is noted that in the operation explanatory diagrams of FIGS. 5A to 5H, the write transistor 23 is illustrated by using a symbol of a switch for the sake of simplicity of an illustration. A capacitance component (an EL capacitor 25) of the organic EL element 21 is also illustrated in FIGS. 5A to 5H.

Figure 4:
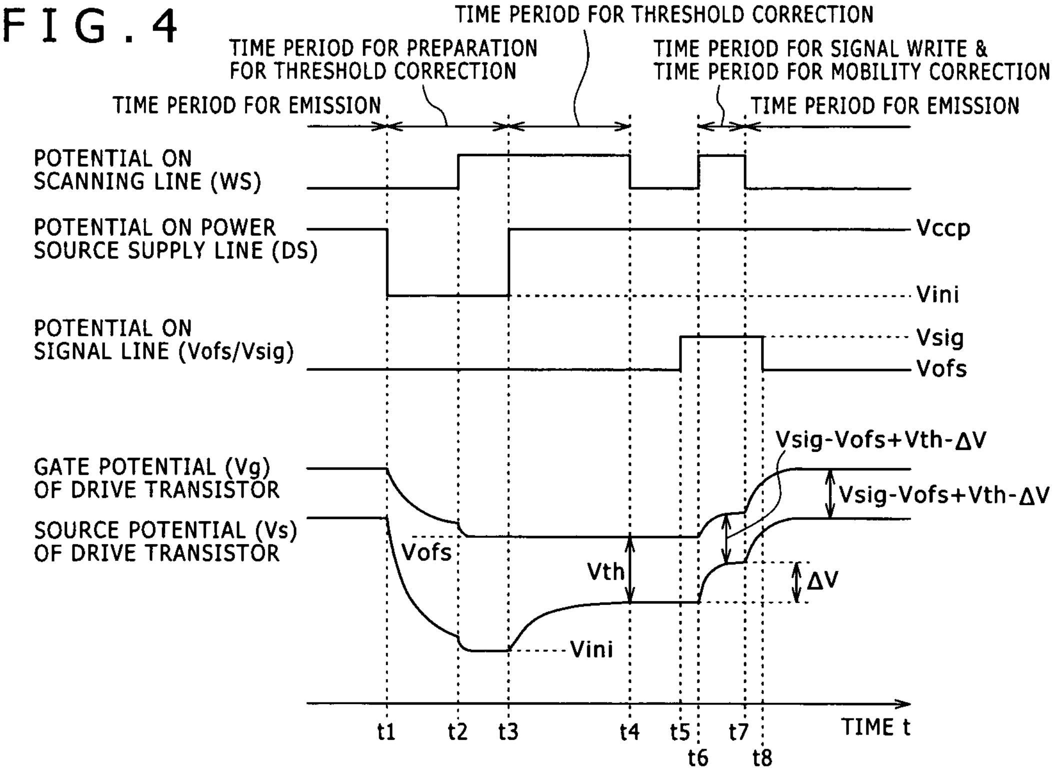
FIG. 4 is a timing waveform chart useful in explaining an operation of the organic EL display device according to the reference example of the present invention.

The timing waveform chart of FIG. 4 represents a change in potential (write scanning signal) WS on the horizontal line 31 (corresponding one of 31-1 to 31-*m*), a change in potential DS on the power source supply line 32 (corresponding one of 32-1 to 32-*m*), a change in potential (Vofs/Vsig) on the signal line 33 (corresponding one of 33-1 to 33-*n*), and changes in gate potential Vg and source potential Vs of the drive transistor 22 for 1H (H is a horizontal time period).

<Time Period for Light Emission>

Figure 5A:
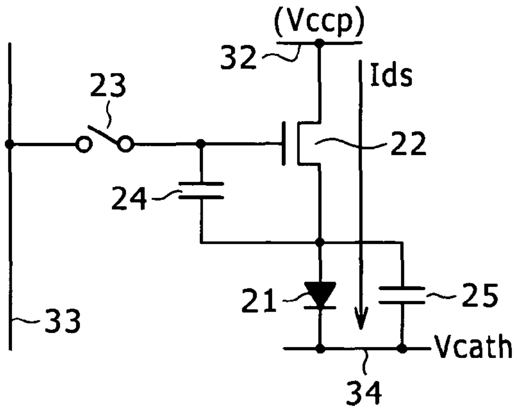
FIGS. 5A to 5H are respectively circuit diagrams explaining the operation of the organic EL display device according to the reference example of the present invention.

In the timing chart of FIG. 4, the organic EL element 21 is in a light emission state (time period for light emission) before a time t1. For this time period for light emission, the potential DS on the power source supply line 32 is held at the first potential Vccp, and the write transistor 23 is in a non-conduction state. At this time, the setting is made so that the drive transistor 22 operates in a saturated region. Thus, as shown in FIG. 5A, a drive current (drain-to-source current) Ids corresponding to a gate-to-source voltage Vgs of the drive transistor 22 is supplied to the organic EL element 21 through from the power source supply line 32 to the drive transistor 22. As a result, the organic EL element 21 emits a light with a luminance corresponding to a current value of the drive current Ids.

<Time Period for Preparation for Threshold Correction>

Figure 5B:
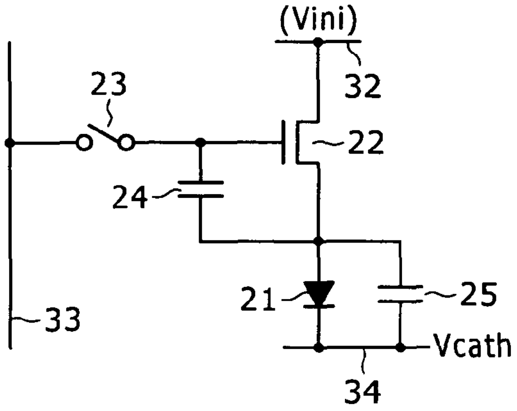

Also, when it becomes the time t1, the operation enters a new field of the line-sequential scanning. As a result, as shown in FIG. 5B, the potential DS on the power source supply line 32 is switched from the first potential (hereinafter referred to as "the higher potential") Vccp to the second potential (hereinafter referred to as "the lower potential") Vini sufficiently lower than the offset voltage of the signal line 33 Vofs−Vth.

Here, when a threshold voltage of the organic EL element 21 is Vel, and the potential on the common power source supply line 34 is Vcath, it is assumed that the lower potential Vini meets a relationship of Vini<Vel+Vcath. In this case, the organic EL element 21 is in a reverse bias state to emit no light because the source potential Vs of the drive transistor 22 becomes approximately equal to the lower potential Vini.

Figure 5C:
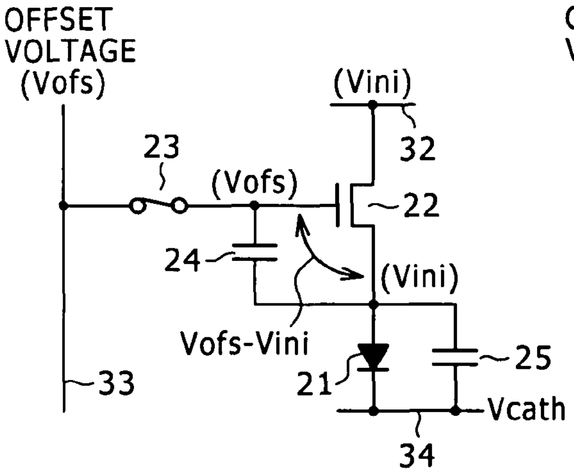

Next, the potential WS on the scanning line 31 transits from the lower potential side to the higher potential side at a time t2, which results in that as shown in FIG. 5C, the write transistor 23 becomes the conduction state. At this time, the gate potential Vg of the drive transistor 22 becomes equal to the offset voltage Vofs because the offset voltage Vofs is supplied from the drive circuit 60 to the signal line 33. In addition, the source potential Vs of the drive transistor 22 is held at the potential Vini sufficiently lower than the offset voltage Vofs.

At this time, the gate-to-source voltage Vgs of the drive transistor 22 becomes equal to (Vofs−Vini). Here, a threshold correcting operation which will be described later cannot be performed unless (Vofs−Vini) is larger than the threshold voltage Vth of the drive transistor 22. Thus, the setting needs to be made so as to obtain a potential relationship of Vofs−Vini>Vth. In the manner as described above, an operation for performing initialization by fixing (determining) the gate potential Vg and the source potential Vs of the drive transistor 22 to the offset voltage Vofs and the lower potential Vini, respectively, is an operation for a preparation for a threshold correction.

<Time Period for Threshold Correction>

Figure 5D:
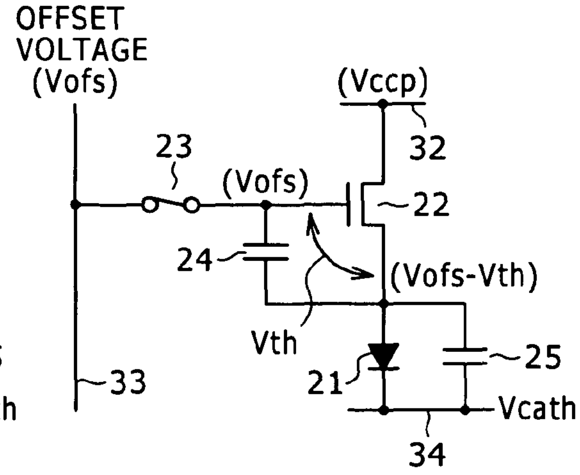

Next, when at a time t3, as shown in FIG. 5D, the potential DS on the power source supply line 32 is switched from the lower potential Vini to the higher potential Vccp, the source potential Vs of the drive transistor 22 begins to rise. Before long, the gate-to-source voltage Vgs of the drive transistor 22 converges to the threshold voltage Vth of the drive transistor 22, and thus a voltage corresponding to the threshold voltage Vth of the drive transistor 22 is held in the hold capacitor 24.

In this case, for the sake of convenience, a time period for which the gate-to-source voltage Vgs which has converged to the threshold voltage Vth of the drive transistor 22 is detected, and a voltage corresponding to the threshold voltage Vth of the drive transistor 22 is held in the hold capacitor 24 is referred to as a time period for a threshold correction. Note that, the current needs to be exclusively caused to flow through the hold capacitor 24 side, and not to be caused to flow through the organic EL element 21 side for the time period for a threshold correction. In order to attain this process, the potential Vcath on the common power source supply line 34 will be set so that the organic EL element 21 becomes a cut-off state.

Figure 5E:
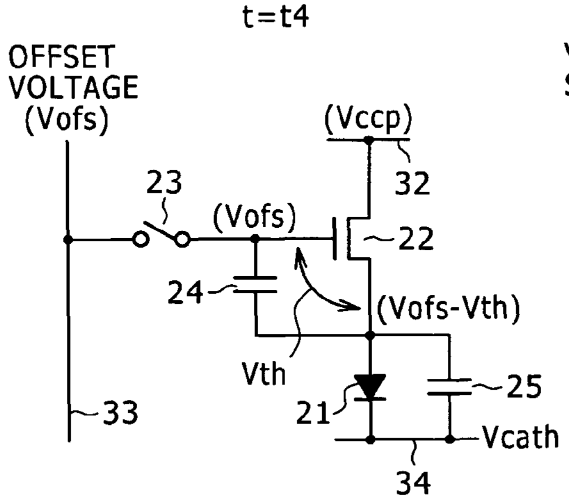

Next, the potential WS on the scanning line 31 transits from the higher potential side to the lower potential side at a time t4, which results in that as shown in FIG. 5E, the write transistor 23 becomes a non-conduction state. At this time, although the gate electrode of the drive transistor 22 becomes a floating state, the drive transistor 22 is held in the cut-off state because the gate-to-source voltage Vgs is equal to the threshold voltage Vth of the drive transistor 22. Therefore, no drain-to-source current Ids is caused to flow through the drive transistor 22.

<Time Period for Write/Time Period for Mobility Correction>

Figure 5F:
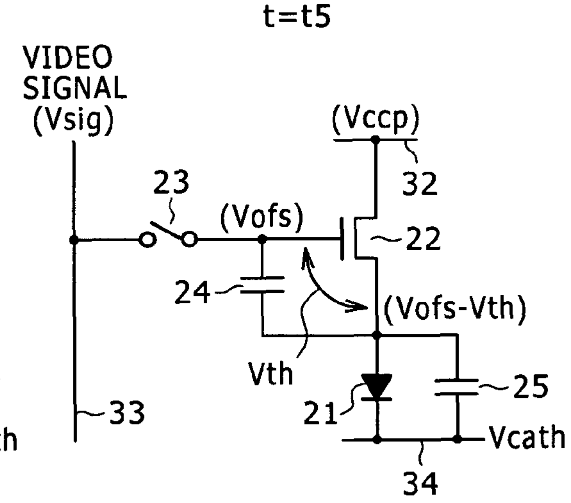
Figure 5G:
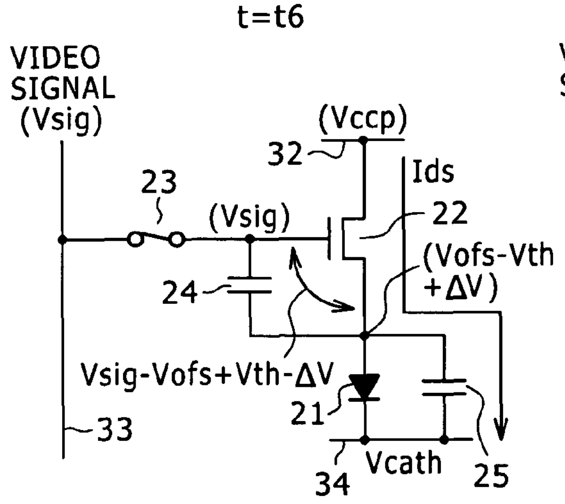

Next, at a time t5, as shown in FIG. 5F, the potential on the signal line 33 is switched from the offset voltage Vofs to the signal voltage Vsig of the video signal. Subsequently, the potential WS on the scanning line 31 transits from the lower potential side to the higher potential side at a time t6. As a result, as shown in FIG. 5G, the write transistor 23 becomes the conduction state to sample the signal voltage Vsig of the video signal, thereby writing the signal voltage Vsig thus sampled to the gate of the drive transistor 22.

The writing of the signal voltage Vsig by the write transistor 23 results in that the gate potential Vg of the drive transistor 22 becomes equal to the signal voltage Vsig of the video signal. Also, during the driving for the drive transistor 22 by using the signal voltage Vsig of the video signal, the threshold voltage Vth of the drive transistor 22 is canceled with the voltage corresponding to the threshold voltage Vth of the drive transistor 22 held in the hold capacitor 24, thereby performing the threshold correction. The principles of the threshold correction will be described later.

At this time, the organic EL element 21 is in the cut-off state (high-impedance state) because it is first in the reverse bias state. While being in the reverse bias state, the organic EL element 21 shows a capacitive property. Therefore, the current (the drain-to-source current Ids) flowing from the power source supply line 32 to the drive transistor 22 in accordance with the signal voltage Vsig of the video signal is caused to flow into the EL capacitor 25 of the organic EL element 21, thereby starting to charge the EL capacitor 25 with the electricity.

By charging the EL capacitor 25 with the electricity, the source potential Vs of the drive transistor 22 rises with time. At this time, the dispersion in the threshold voltages Vth of the drive transistors 22 is previously corrected. As a result, the drain-to-source current Ids of the drive transistor 22 depends on a mobility u of the drive transistor 22.

Here, it is assumed that a write gain (a ratio of the gate-to-source voltage Vgs held of the hold capacitor 24 to the signal voltage Vsig of the video signal) is 1 (ideal value). In this case, the source potential Vs of the drive transistor 22 rises up to a potential (Vofs−Vth+ΔV), which results in that the gate-to-source voltage Vgs of the drive transistor 22 becomes equal to (Vsig−Vofs+Vth−ΔV).

That is to say, an increase ΔV in source potential Vs of the drive transistor 22 acts so as to be subtracted from the voltage (Vsig−Vofs+Vth) held in the hold capacitor 24, in other words, so as to discharge the electric charges charged in the hold capacitor 24. As a result, negative feedback is carried out. Therefore, the increase ΔV in source potential Vs becomes a feedback amount of negative feedback.

In the manner as described above, the drain-to-source current Ids flowing through the drive transistor 22 is negatively fed back to a gate input of the drive transistor 22, that is, to the gate-to-source voltage Vgs, thereby performing the mobility correction. In this case, the mobility correction is performed so as to cancel the dependency of the drain-to-source current Ids of the drive transistor 22 on the mobility μ, that is, so as to correct the dispersion in the mobilities μ of the pixels.

More specifically, the higher the signal voltage Vsig of the video signal is, the larger the drain-to-source current Ids becomes. Thus, an absolute value of the feedback amount (correction amount) ΔV of negative feedback also becomes large. As a result, the mobility correction corresponding to the emission luminance level is carried out. In addition, when the signal voltage Vsig of the video signal is set as being constant, the larger the mobility μ of the drive transistor 22 is, the larger the absolute value of the feedback amount ΔV of negative feedback also becomes. As a result, it is possible to remove the dispersion in the mobilities μ of the pixels (sub-pixels). The principles of the mobility correction will be described later.

<Time Period for Light Emission>

Figure 5H:
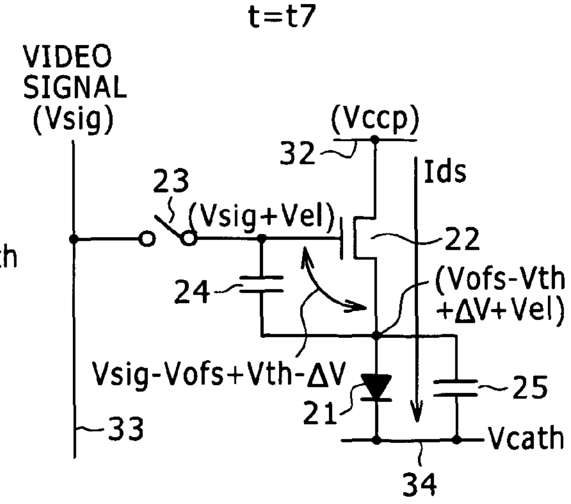

Next, the potential WS on the scanning line 31 transits from the higher potential side to the lower potential side at a time t7, which results in that as shown in FIG. 5H, the write transistor 23 becomes the non-conduction state. As a result, the gate electrode of the drive transistor 22 is electrically disconnected from the signal line 33 to become a floating state.

Here, while the gate electrode of the drive transistor 22 is held in the floating state, the hold capacitor 24 is connected between the gate and the source of the drive transistor 22. Thus, when the source potential Vs of the drive transistor 22 fluctuates, the gate potential Vg of the drive transistor 22 also fluctuates in conjunction with (so as to follow) the fluctuation of the source potential Vs of the drive transistor 22. This operation is a bootstrap operation made by the hold capacitor 24.

The drain-to-source current Ids of the drive transistor 22 begins to flow through the organic EL element 21 at the same time that the gate electrode of the drive transistor 22 becomes the floating state. As a result, the anode potential of the organic EL element 21 rises in correspondence to the drain-to-source current Ids of the drive transistor 22.

The rise in the anode potential of the organic EL element 21 is nothing else but a rise in the source potential Vs of the drive transistor 22. When the source potential Vs of the drive transistor 22 rises, the gate potential Vg of the drive transistor 22 also rises in conjunction with the rise in the source potential Vs of the drive transistor 22 in accordance with the bootstrap operation made by the hold capacitor 24.

At this time, when it is assumed that a bootstrap gain is 1 (ideal value), a rise amount of gate potential Vg becomes equal to a rise amount of source potential Vs. For this reason, for a time period for light emission, the gate-to-source voltage Vgs of the drive transistor 22 is held at a constant value of (Vsig−Vofs+Vth−ΔV).

Also, when the reverse bias state of the organic EL element 21 is dissolved to obtain a forward bias state along with the rise in the source potential Vs of the drive transistor 22, the organic EL element 21 actually starts to emit a light because a drive current is supplied from the drive transistor 22 to the organic EL element 21. After that, the potential on the signal line 33 is switched from the signal voltage Vsig of the video signal to the offset voltage Vofs at a time t8

(Principles of Threshold Correction)

Here, the principles of the threshold correction for the drive transistor 22 will be described. The drive transistor 22 operates as a constant current source because it is designed so as to operate in the saturated region. As a result, a constant drain-to-source current (drive current) Ids which is given by Expression (1) is supplied from the drive transistor 22 to the organic EL element 21:

$$Ids=(1/2)\cdot\mu(W/L)Cox(Vgs-Vth)^2 \quad (1)$$

where W is a channel width of the drive transistor 22, L is a channel length of the drive transistor 22, and Cox is a gate capacitance per unit area.

Figure 6:
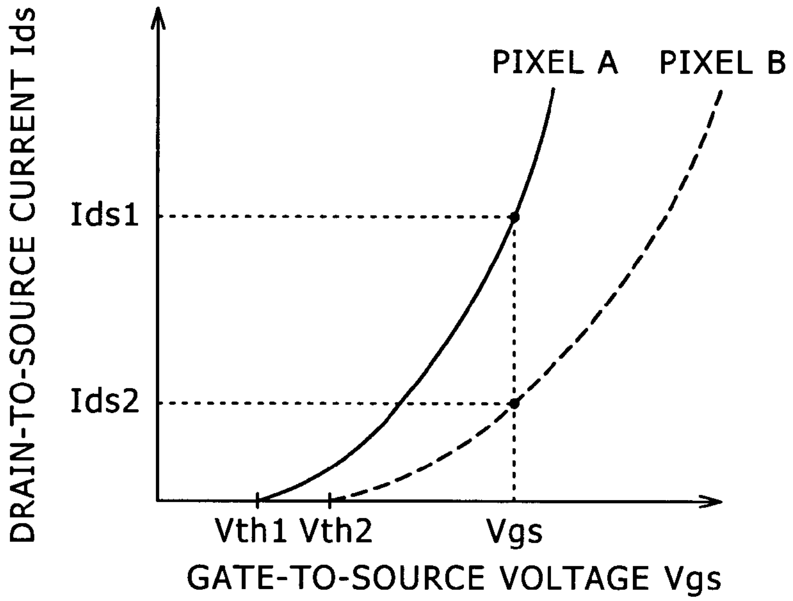
FIG. 6 is a characteristic curve useful in explaining a problem caused by a dispersion of threshold voltages Vth of drive transistors.

FIG. 6 shows characteristics of the drain-to-source current Ids vs. the gate-to-source voltage Vgs of the drive transistor 22.

As shown in these characteristic curves, when the threshold voltage Vth is Vth1, the drain-to-source current Ids corresponding to the gate-to-source voltage Vgs becomes Ids1 unless the correction for the dispersion in the threshold voltages Vth of the drive transistors 22 of the pixels (sub-pixels) is carried out.

On the other hand, when the threshold voltage Vth is Vth2 (Vth2>Vth1), the drain-to-source current Ids corresponding to the same gate-to-source voltage Vgs as that in the above case becomes Ids2 (Ids2<Ids1). That is to say, when the threshold voltage Vth of the drive transistor 22 fluctuates, the drain-to-source current Ids also fluctuates even if the gate-to-source voltage Vgs is constant.

On the other hand, in the pixel circuit having the above configuration, as previously described, the gate-to-source voltage Vgs in the phase of the light emission is given by (Vsig−Vofs+Vth−ΔV). Thus, when the gate-to-source voltage Vgs is substituted into Expression (1), the drain-to-source current Ids is expressed by Expression (2):

$$Ids=(1/2)\cdot\mu(W/L)Cox(Vsig-Vofs-\Delta V)^2 \quad (2)$$

That is to say, a term of the threshold voltage Vth of the drive transistor 22 is canceled in Expression (2). Thus, the drain-to-source current Ids supplied from the drive transistor 22 to the organic EL element 21 does not depend on the threshold voltage Vth of the drive transistor 22. As a result, the drain-to-source current Ids does not fluctuate even when the threshold voltage Vth of the drive transistor 22 fluctuates each pixel owing to the dispersion caused by the manufacturing process of the drive transistor 22, or the deterioration with age. Therefore, the emission luminance of the organic EL element 21 can be held constant.

(Principles of Mobility Correction)

Next, the principles of a mobility correction for the drive transistor 22 will be described. In this case, for the sake of convenience of a description, "the sub-pixel" is described as "the pixel."

Figure 7:
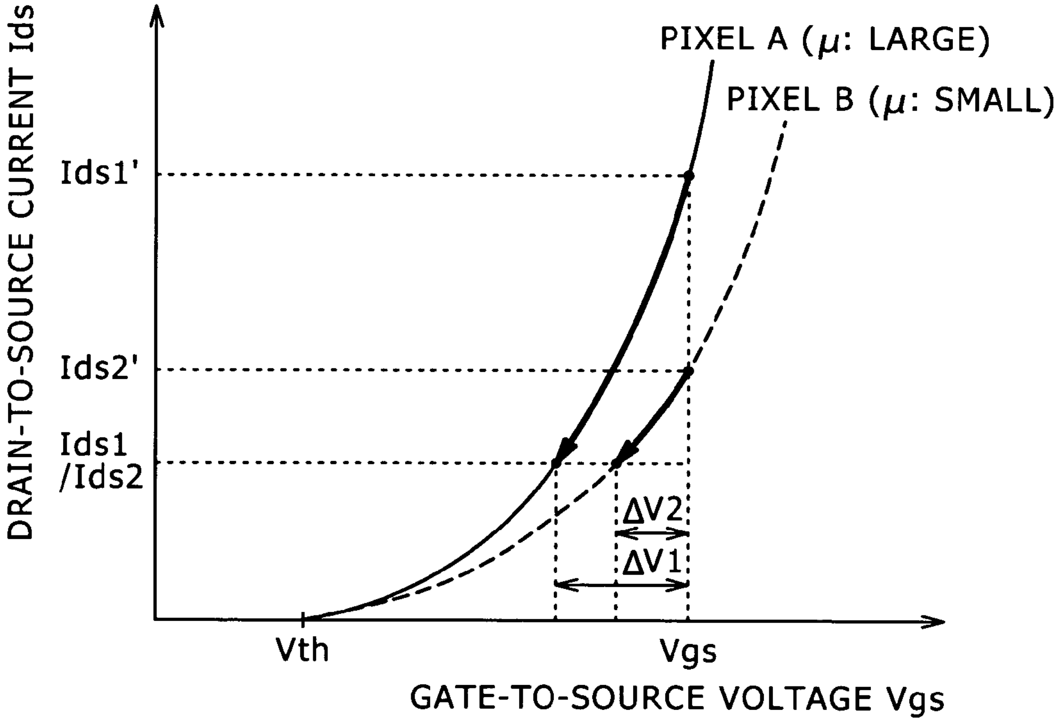
FIG. 7 is a characteristic curve useful in explaining a problem caused by a dispersion of mobilities μ of drive transistors.

FIG. 7 shows characteristic curves in a state in which a pixel A having a relatively large mobility μ of the drive transistor 22, and a pixel B having a relatively small mobility μ of the drive transistor 22 are compared with each other. When the drive transistor 22 is composed of a polysilicon thin film transistor or the like, it is impossible to avoid that the mobility μ disperses in the pixels as in the pixels A and B.

When the signal voltages Vsig of the video signals having the same level, for example, are written to the pixels A and B, respectively, in a state in which there is the dispersion of the mobilities μ of the pixels A and B, a large difference occurs between a drain-to-source current Ids1' flowing through the pixel A having the large mobility μ, and a drain-to-source current Ids2' flowing through the pixel B having the small mobility μ unless the correction is performed for the mobilities μ of the pixels A and B. When the large difference occurs between the drain-to-source currents Ids of the pixels due to the dispersion in the mobilities μ of the pixels in such a manner, the uniformity in the picture is impaired.

Here, as apparent from the transistor characteristics expressed by Expression (1), when the mobility μ is large, the drain-to-source current Ids becomes large. Therefore, the larger the mobility μ is, the larger the amount, ΔV, of feedback in the negative feedback becomes. As shown in FIG. 7, an amount, ΔV1, of feedback in the pixel A having the large mobility μ is larger than an amount, ΔV2, of feedback in the pixel B having the small mobility μ.

In order to cope with this situation, the drain-to-source current Ids of the drive transistor 22 is negatively fed back to the signal voltage Vsig side of the video signal by performing an operation for correcting a mobility. As a result, the larger the mobility μ is, the larger the negative feedback becomes. As a result, it is possible to suppress the dispersion in the mobilities μ of the pixels.

Specifically, when the correction corresponding to the amount, ΔV1, of feedback is performed in the pixel A having the large mobility μ, the drain-to-source current Ids drops from Ids1' to Ids1. On the other hand, when the correction corresponding to the amount, ΔV2, of feedback is performed in the pixel B having the small mobility μ, the drain-to-source current Ids drops from Ids2' to Ids2, and thus does not largely drop so much because the amount, ΔV2, of feedback in the pixel B having the small mobility μ is small. As a result, the dispersion in the mobilities μ of the pixels is corrected because the drain-to-source current Ids1 of the pixel A, and the drain-to-source current Ids2 of the pixel B become approximately equal to each other.

The above is summarized as follows. That is to say, when there are the pixel A and B different in mobility u from each other, the amount, ΔV1, of feedback in the pixel A having the larger mobility μ becomes larger than the amount, ΔV2, of feedback in the pixel B having the smaller mobility μ. In other words, the amount, ΔV2, of feedback in the pixel B becomes large and the reduction amount of drain-to-source current Ids becomes large as the pixel has the larger mobility μ.

Therefore, the drain-to-source current Ids of the drive transistor 22 is negatively fed back to the signal voltage Vsig of the video signal, thereby unifying the drain-to-source currents Ids of the pixels different in mobility μ from each other. As a result, it is possible to correct the dispersion in the mobilities μ of the pixels.

Here, a description will be given with respect to a relationship between the signal potential (sampling potential) Vsig of the video signal, and the drain-to-source current Ids depending on done or not done of the threshold correction and the mobility correction in the pixel circuit shown in FIG. 2 with reference to FIGS. 8A to 8C.

Figure 8A:
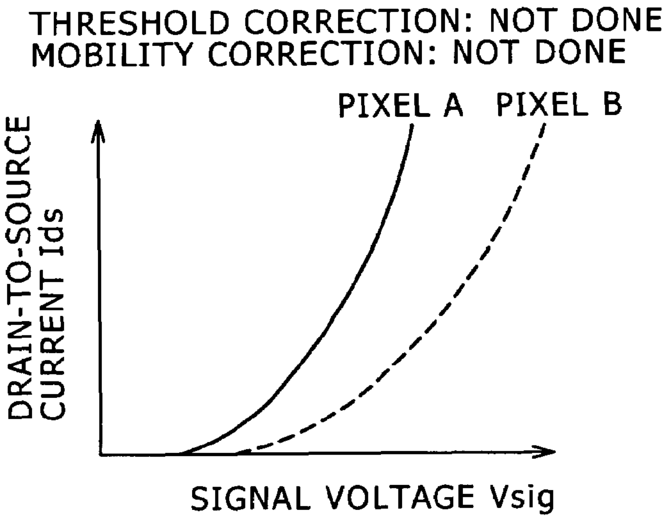
FIGS. 8A to 8C are respectively characteristic curves useful in explaining a relationship between a signal voltage Vsig of a video signal, and a drain-to-source current Ids of a drive transistor based on done or not done of a threshold correction and a mobility correction.

FIG. 8A shows characteristic curves in the case where neither of the threshold correction and the mobility correction is performed for the pixels A and B. FIG. 8B shows characteristic curves in the case where no mobility correction is performed for the pixels A and B, but only the threshold correction is performed therefor. Also, FIG. 8C shows characteristic curves in the case where both the threshold correction and the mobility correction are performed for the pixels A and B. As shown in FIG. 8A, in the case where neither of the threshold correction and the mobility correction is performed for the pixels A and B, a large difference occurs between the drain-to-source currents Ids of the pixels A and B due to the dispersions in the threshold voltages Vth and the mobilities u of the pixels A and B.

Figure 8B:
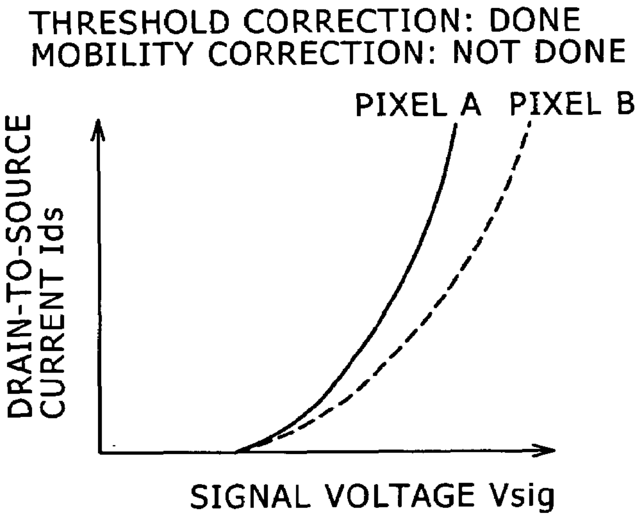

On the other hand, in the case where only the threshold correction is performed for the pixels A and B, as shown in FIG. 8B, the dispersion in the drain-to-source currents Ids can be reduced to some degree by performing the threshold correction concerned. However, there is still left a difference between the drain-to-source currents Ids of the pixels A and B due to the dispersion in the mobilities μ of the pixels A and B.

Figure 8C:
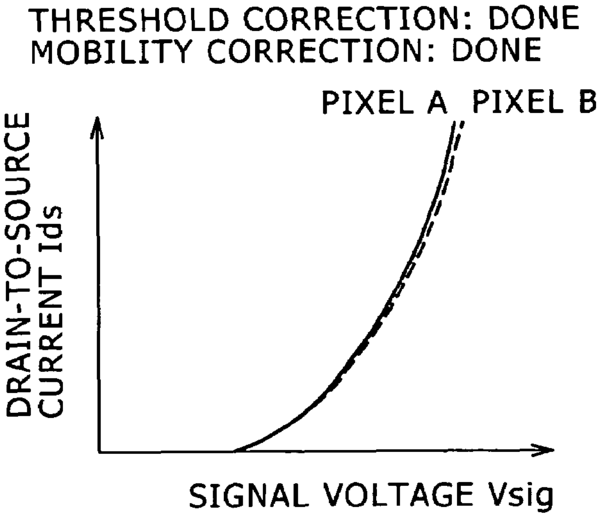

Also, both the threshold correction and the mobility correction are performed for the pixels A and B, which results in that as shown in FIG. 8C, it is possible to approximately remove the difference between the drain-to-source currents Ids of the pixels A and B due to the dispersion in the threshold voltages Vth and the mobilities μ of the pixels A and B. As a result, no dispersion in the luminances of the organic EL elements 21 occurs in any of the gradations, and thus it is possible to obtain the displayed image having the excellent image quality.

In addition, the pixel 20 shown in FIG. 2 is provided with the bootstrap function previously described in addition to the correction functions for performing the threshold correction and the mobility correction, thereby making it possible to obtain the following operations and effects.

That is to say, even when the I-V characteristics of the organic EL element 21 deteriorate with time, and the source potential Vs of the drive transistor 22 changes along with this deterioration with time, the gate-to-source voltage Vgs of the drive transistor 22 is maintained constant by performing the bootstrap operation in the hold capacitor 24. As a result, current flowing through the organic EL element 21 does not change. Therefore, since the emission luminance of the organic EL element 21 is also held constant, even when the I-V characteristics of the organic EL element 21 deteriorate with time, it is possible to realize the image display free from the luminance deterioration following that deterioration with time.

As apparent from the above description, in the organic EL display device 10A according to the reference example, with the pixel configuration that the sub-pixel 20R (20G, 20B) includes two transistors of the drive transistor 22 and the write transistor 23, the correction functions of the compensation function, the threshold correction, and the mobility correction for the fluctuation in the characteristics of the organic EL element 21 can be realized equally to the case of the organic EL display device, described in Patent Document 1, including several transistors in addition to those transistors. Also, the pixel size can be miniaturized all the more because the number of constituent elements of the pixel circuits is less. As a result, it is possible to realize the promotion of the high definition of the display panel.

[Organic EL Display Device of Embodiment]

Figure 9:
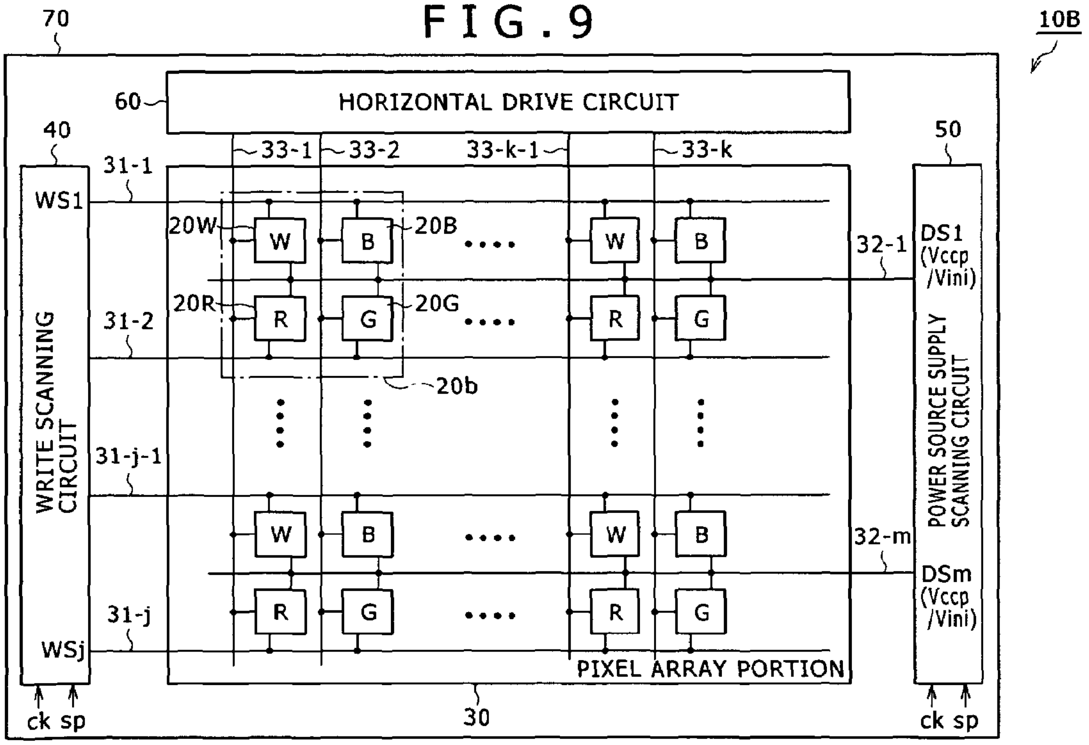
FIG. 9 is a system configuration diagram schematically showing a configuration of an organic EL display device according to an embodiment of the present invention.

FIG. 9 is a system configuration diagram schematically showing a configuration of an active matrix type display device according to an embodiment of the present invention. In the figure, constituent elements similar to or corresponding to those previously described with reference to FIG. 1 are designated by the same reference numerals, respectively.

This embodiment will now be described by giving the active matrix type EL display device using the current driven type electro-optic element having the emission luminance which changes depending on the value of the current flowing through the device, for example, the organic EL element as the light emitting element of the sub-pixel as an example.

As shown in FIG. 9, an organic EL display device 10B according to this embodiment of the present invention includes a pixel array portion 30, and a drive portion, for example, a write scanning circuit 40, a power source supply scanning circuit 50 and a horizontal drive circuit 60. In this case, unit pixels 20*b* are two-dimensionally disposed in a matrix in the pixel array portion 30. The drive portion is disposed in a peripheral portion (screen frame) of the pixel array portion 30 and drives unit pixels 20*b*. Thus, the organic EL display device 10B basically has the same system configuration as that of the organic EL display device 10A of the reference example.

Also, the organic EL display device 10B of this embodiment is different from the organic EL display device 10A of the reference example in configuration of the unit pixel 20*b* and configuration of a drive system accompanying the configuration of the unit pixel 20*b*. Specifically, in the organic EL display device 10A of the reference example, the unit pixel 20*a* is composed of the sub-pixels 20R, 20G and 20B belonging to the same row, whereas in the organic EL display device 10B of this embodiment, the unit pixel 20*b* is composed of a plurality of adjacent sub-pixels belonging to a plurality of rows, for example, upper and lower two rows.

Also, for the purpose of promoting the high luminance, the low power consumption and the like, the unit pixel 20*b* in this embodiment is composed of four kinds of sub-pixels 20W, 20R, 20G and 20B having a sub-pixel 20W which corresponds to white (W) and which has the high frequency in use in addition to the sub-pixels 20R, 20G and 20B corresponding to R, G and B, respectively, with two rows and two columns as a unit.

Of the four kinds of sub-pixels 20W, 20R, 20G and 20B, for example, the sub-pixels 20W and 20B belong to the upper row, and the sub-pixels 20R and 20G belong to the lower row. In addition, the sub-pixels 20W and 20R belong to the left column, and the sub-pixels 20B and 20G belong to the right column. Each of the pixel circuits of the four kinds of sub-pixels 20W, 20R, 20G and 20B has the same configuration as that of the pixel circuit shown in FIG. 2.

In the manner as described above, since the unit pixel 20*b* has two rows and two columns as a unit, the number of rows becomes double that in the case where the circuit pixel 20*a* has one row and three columns as a unit (in the case of the organic EL display device 10A of the reference example), and the number of columns becomes ⅔ of that in that case. Therefore, the dispersion of the sub-pixels of the pixel array portion 30 has j rows (j=2m) and k columns (k=(⅔)×n).

In the sub-pixel disposition having the j rows and the k columns, scanning lines 31-1 to 31-*j* are wired so as to correspond to the j rows, respectively, and signal lines 33-1 to 33-*k* are wired so as to correspond to the k columns, respectively. That is to say, although the number of scanning lines 31-1 to 31-*j* increases to be double that in the case of the circuit pixels 20*a* having one row and three columns as a unit, with regard to the signal lines 33-1 to 33-*k*, the number thereof per unit pixel can be reduced from three lines to two lines.

Normally, the power source supply lines 32 are wired so as to correspond to the rows, respectively, similarly to the case of the scanning lines 31. However, in the organic EL display device 10B of this embodiment, one power source supply line 32 is wired per unit pixel 20*b* (including the four kinds of sub-pixels 20W, 20R, 20G and 20B), that is, one power source supply line 32 is wired per two rows. Thus, the power source supply lines 32-1 to 32-*m* are wired in total. That is to say, the organic EL display device 10B of this embodiment adopts a configuration that one power source supply line 32 (corresponding one of 32-1 to 32-*m*) is shared among the four kinds of sub-pixels 20W, 20R, 20G and 20B constituting the same unit pixel 20*b*.

The feature of the organic EL display device 10B of this embodiment is that one power source supply line 32 (corresponding one of 32-1 to 32-*m*) is made common to the four kinds of sub-pixels 20W, 20R, 20G and 20B constituting the same unit pixel 20*b* and belonging to the upper and lower two rows. A concrete circuit operation or the like in the case where the four kinds of sub-pixels 20W, 20R, 20G and 20B are driven by the power source supply scanning circuit 50 through one power source supply line 32 (corresponding one of 32-1 to 32-*m*) will be described later.

One power source supply line 32 is shared among the four kinds of sub-pixels 20W, 20R, 20G and 20B constituting the unit pixel 20*b*, which results in that the number of rows increases to be double that in the case of the unit pixel 20*a* having one row and three columns as a unit. However, the circuit configuration having the same m stages as those in the case of the unit pixel 20*a* having one row and three columns as a unit is maintained as it is for the power source supply scanning circuit 50.

The write scanning circuit 40 needs to have a circuit configuration adapted to output j write scanning signals for the number of rows. However, from the reason which will be described later, shift registers may have a circuit configuration having m stages. Also, the j write scanning signals the number of which is double that of the m write scanning signals have to be generated in a logic circuit in a subsequent stage of the shift registers of the m stages based on the m write scanning signals outputted from the shift registers of the m stages (its details will be described later).

In addition, with regard to the horizontal drive circuit 60, the number of columns is reduced to ⅔ of that in the case of the unit pixel 20*a* having one row and three columns as a unit. As a result, the circuit scale of the horizontal drive circuit 60 can be reduced in correspondence to that reduction in number of columns.

(Layout of Unit Pixel)

Here, a description will be given with respect to a disposition relationship among the constituent elements of each of the sub-pixels of the unit pixel 20*b*, the scanning lines 31 and the power source supply lines 32. In this case, the description will now be given by giving the case where in addition to the hold capacitor (Cs) 24, a subsidiary capacitor (Csub) 25 for making up for a deficiency of the capacitance in the organic EL element 21 is provided as an example. Note that, the reason that a size of the subsidiary capacitor (Csub) 25 differs depending on emission colors is as follows.

That is to say, the organic EL element 21 differs in emission efficiency depending on the emission colors. For this reason, a size of the drive transistor 22 for current-driving the organic EL element 21 differs depending on the emission colors of the organic EL elements 21. The size of the drive transistor 22 differs depending on the emission colors of the organic EL elements 21, which results in that a difference occurs in a time period for a mobility correction for which the mobility correction is performed depending on the emission colors of the organic EL elements 21.

The time period for a mobility correction depends on the capacitance component (EL capacitor) of the organic EL element 21. Therefore, in order to make the time period for a mobility correction constant irrespective of the emission colors of the organic EL elements 21, it is necessary to cause the capacitive component (EL capacitor) to differ among the emission colors of the organic EL elements 21 by changing the size of the organic EL element 21 in correspondence to the size of the drive transistor 22. However, there is a limit to increasing the size of the organic EL element 21 from a relationship of an aperture ratio of the pixel, or the like.

In order to cope with this situation, the subsidiary capacitor (Csub) 25 is used, and one electrode thereof is connected to the anode electrode of the organic EL element 21, and the other electrode thereof is connected to a portion having a fixed potential, for example, the common power source supply line 34. Thus, the size of the subsidiary capacitor (Csub) 25 is changed depending on the emission colors of the organic EL elements 21, thereby making the time period for a mobility correction constant irrespective of the emission lights of the organic EL elements 21 while making up for a deficiency of the capacitance of the EL capacitor.

REFERENCE EXAMPLE

Firstly, a disposition relationship among constituent elements of each of the sub-pixels 20*a*, the scanning lines 31, and the power source supply lines 32 in the case where one power source supply line 32 is wired per row will be described as a reference example with reference to FIG. 10.

Figure 10:
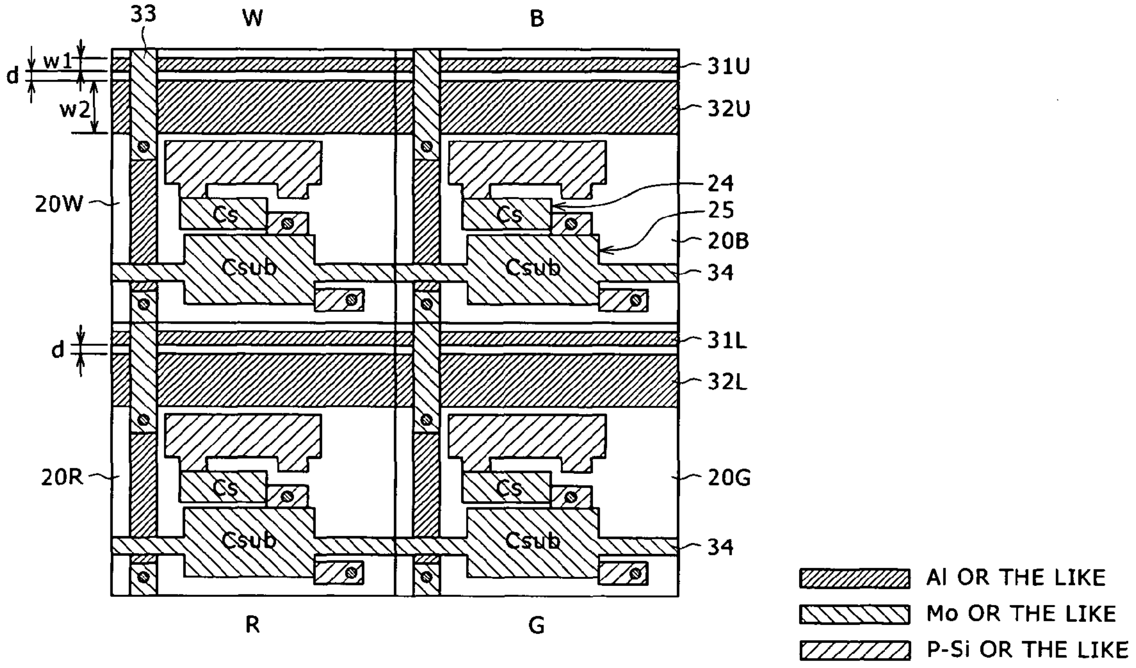
FIG. 10 is a layout diagram showing a disposition relationship among constituent elements of sub-pixels, scanning lines, and power source supply lines in a unit pixel in the case where one power source supply line is wired every row.

As shown in FIG. 10, of the four kinds of sub-pixels 20W, 20R, 20G and 20B corresponding to W, R, G and B, respectively, for example, the sub-pixels 20W and 20B belong to the upper row, and the sub-pixels 20R and 20G belong to the lower row. In addition, the sub-pixels 20W and 20R belong to the left column, and the sub-pixels 20B and 20G belong to the right column.

Upper side portions of these sub-pixels 20W, 20R, 20G and 20B constitute wiring regions, respectively, and the constituent elements including the hold capacitors (Cs) 24 and the subsidiary capacitors (Csub) 25 are formed in regions from central portions to lower sides of these sub-pixels 20W, 20R, 20G and 20B, respectively.

A scanning line 31U and a power source supply line 32U belonging to the upper row are wired at a predetermined interval "d" along a row direction (along a sub-pixel disposition directions of the rows) in the wiring regions of the sub-pixels 20W and 20B. Likewise, a scanning line 31L and a power source supply line 32L belonging to the lower row are wired at the predetermined interval "d" along the row direction in the wiring regions of the sub-pixels 20R and 20G, respectively.

Here, the power source supply lines 32U and 32L are wirings through which the drive currents are supplied to the drive transistors, respectively, and through which light emission/non-light emission of the organic EL elements 21 is controlled. Therefore, a wiring width w2 of each of the power source supply lines 32U and 32L is wider than a wiring width w1 of each of the scanning lines 31U and 31L through which the write scanning signal are transmitted, respectively.

As described above, when the configuration is adopted such that one power source supply line 32 (corresponding one of 32U and 32L) is wired every one row, as apparent from the above description, the high definition of the pixels (sub-pixels) is reduced because the one power source supply line 32 has a large rate of occupying the pixel area.

First Example

Figure 11:
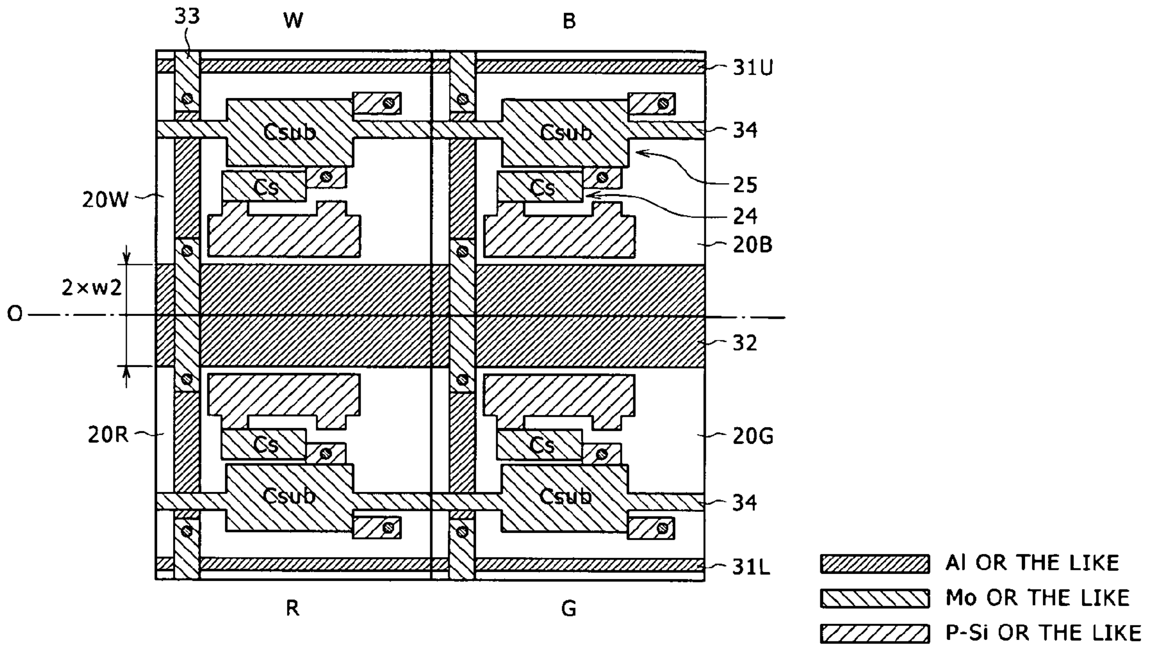
FIG. 11 is a layout diagram showing a first example of a disposition relationship among constituent elements of sub-pixels, scanning lines, and power source supply lines in a unit pixel in the case where one power source supply line is wired every two rows.

FIG. 11 is a layout diagram showing a first example of a disposition relationship among the constituent elements of each of the sub-pixels of the unit pixel 20*b*, the scanning lines 31 and the power source supply line 32 in the case where one power source supply line 32 is wired every two rows. In the figure, constituent elements similar to or corresponding to those previously described with reference to FIG. 10 are designated with the same reference numerals, respectively.

As shown in FIG. 11, of the four kinds of sub-pixels 20W, 20R, 20G and 20B corresponding to W, R, G and B, respectively, for example, the sub-pixels 20W and 20B belong to the upper row, and the sub-pixels 20R and 20G belong to the lower row. In addition, the sub-pixels 20W and 20R belong to the left column, and the sub-pixels 20B and 20G belong to the right column.

In addition, as apparent from FIG. 11, the disposition of the constituent elements including the hold capacitor (Cs) 24 and the subsidiary capacitor (Csub) 25 in the sub-pixels 20W and 20B belonging to the upper row, and the disposition of the constituent elements including the hold capacitor (Cs) 24 and the subsidiary capacitor (Csub) 25 in the sub-pixels 20R and 20G belonging to the lower row show a vertically symmetrical relationship with respect to a boundary line O between the upper row and the lower row. As a result, a wide wiring region can be ensured between the lower end portions of the sub-pixels 20W and 20B, and the upper end portions of the sub-pixels 20R and 20G.

Also, a scanning line 31U belonging to the upper side row is wired in the upper end wiring regions of the sub-pixels 20W and 20B along the row direction, and a scanning line 31L belonging to the lower side row is wired in the lower end wiring regions of the sub-pixels 20R and 20G along the row direction. Also, a power source supply line 32 common to the upper and lower two rows is wired in the lower end wiring regions of the sub-pixels 20W and 20B, and the upper end wiring regions of the sub-pixels 20R and 20G at a wiring width of 2×w2 along the row direction.

As described above, the constituent elements of the sub-pixels 20W and 20B belonging to the upper row, and the constituent elements of the sub-pixels 20R and 20G belonging to the lower row show the vertically symmetrical relationship with respect to the boundary line O. Also, the power source supply line 32 is wired in the wiring region between the constituent elements of the upper sub-pixels and the constituent elements of the lower sub-pixels, which results in that a distance between the power source supply line 32 and each of the drain electrodes of the drive transistors 22 of the upper and lower sub-pixels becomes short. Therefore, there is an advantage that the electrical correction between them can be simply performed.

As described above, the configuration is adopted such that one power source supply line 32 is wired every two rows, that is, one power source supply line 32 is wired every four sub-pixels 20W, 20R, 20G, and 20B of the same unit pixel 20. As a result, the degree of the high definition of the pixels can be enhanced and the degree of freedom of the layout can be increased all the more because it become unnecessary to ensure the distance “d” between the scanning line 31U and the power source supply line 32U belonging to the upper side row, and the distance “d” between the scanning line 31L and the power source supply line 32L belonging to the lower side row.

In addition, the wiring width 2×w2 of the power source supply line 32 is double the wiring width w2 in the case where one power source supply line 32 is wired every one row. As a result, it is possible to reduce a difference in propagation delay between the power supply scanning circuit 50 and the sub-pixel located away therefrom, and the power supply scanning circuit 50 and the sub-pixel located close thereto because it is possible to reduce a wiring resistance per one sub-pixel in the case of the monochrome light emission, specifically, in the case where the sub-pixel 20R, 20G or 20B singularly emits a light.

Second Example

Figure 12:
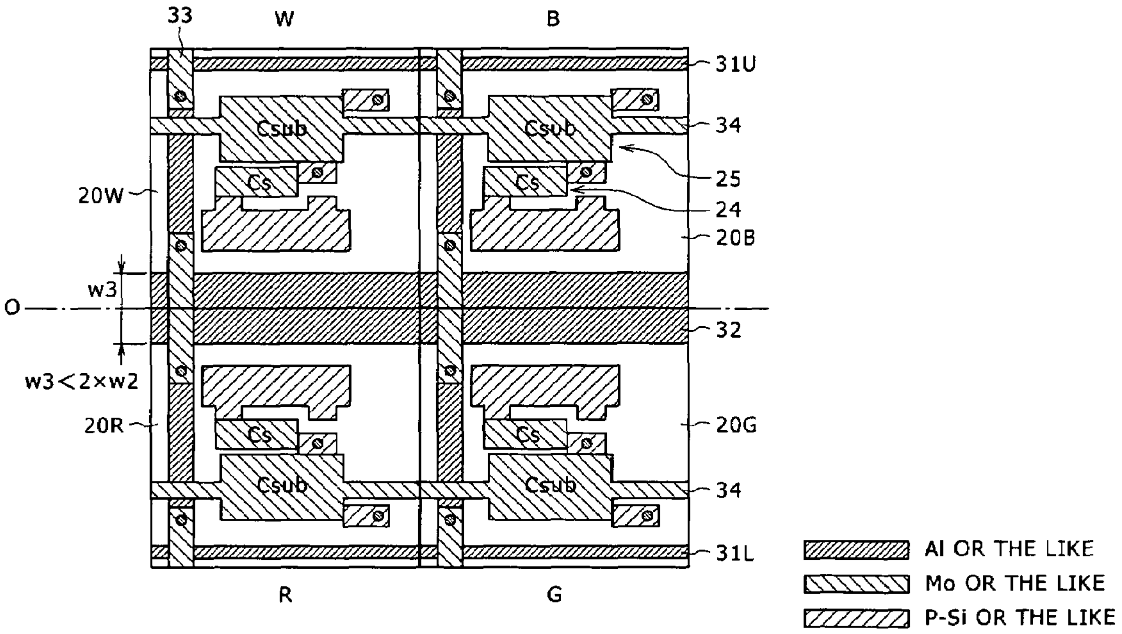
FIG. 12 is a layout diagram showing a second example of a disposition relationship among constituent elements of sub-pixels, scanning lines, and power source supply lines in a unit pixel in the case where one power source supply line is wired every two rows.

FIG. 12 is a layout diagram showing a second example of a disposition relationship among the constituent elements of each of the sub-pixels of the unit pixel 20*b*, the scanning lines 31 and the power source supply line 32 in the case where one power source supply line 32 is wired every two rows. In the figure, constituent elements similar to or corresponding to those previously described with reference to FIG. 11 are designated with the same reference numerals, respectively.

The first example adopts the configuration that the wiring width 2×w2 of the power source supply line 32 is double the wiring width w2 in the case where one power source supply line 32 is wired every one row. On the other hand, as apparent from FIG. 12, the second example adopts a configuration that a wiring width w3 of the power source supply line 32 is set as being narrower than the wiring width 2×w2 in the first example.

Setting the wiring width w3 of the power source supply line 32 as being narrower than the wiring width 2×w2 increases the wiring resistance per one sub-pixel in the case of the monochrome light emission. However, the number of constituent elements of the pixel circuit can be increased all the more because it is possible to sufficiently obtain the disposition space for the elements of the sub-pixels 20W, 20R, 20G and 20B. In addition, it is possible to realize the promotion of the high definition for the display panel 70 because the sizes of the sub-pixels 20W, 20R, 20G and 20B can be miniaturized.

(Circuit Operation)

Subsequently, a circuit operation of the organic EL display device 10B of this embodiment will now be described with reference to a timing waveform chart of FIG. 13.

Figure 13:
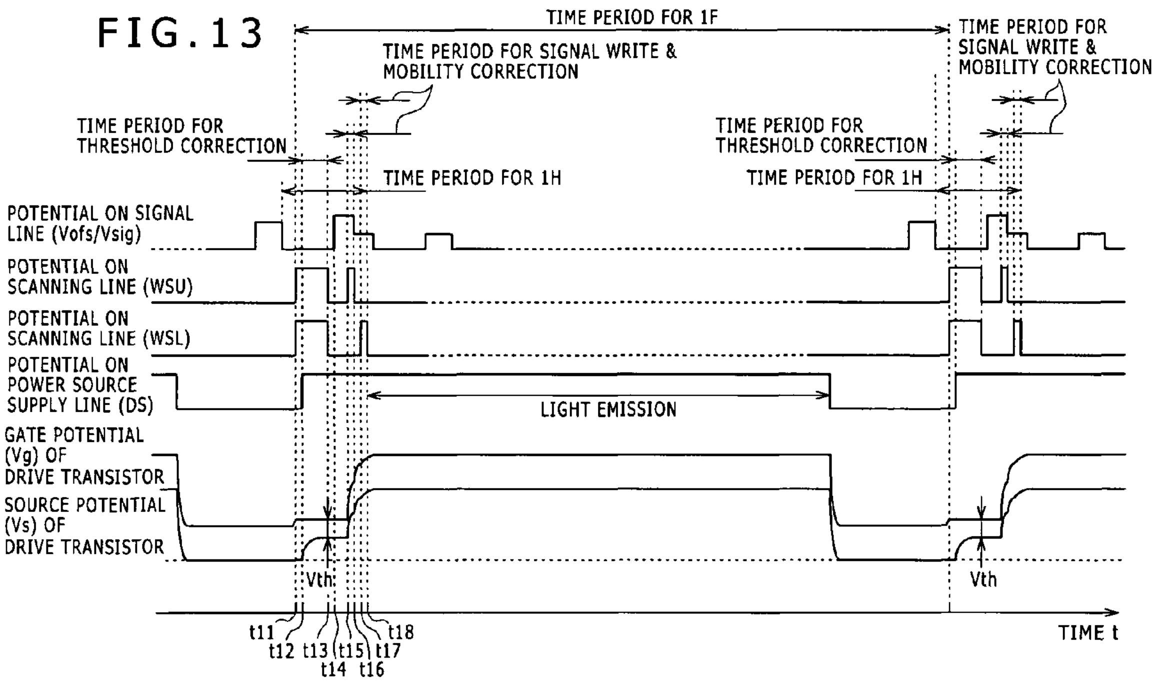
FIG. 13 is a timing waveform chart useful in explaining an operation of the organic EL display device according to the embodiment of the present invention.

FIG. 13 represents a change in potential (Vofs/Vsig) on the signal line 33, changes in potentials (write scanning signals) WSU and WSL on the upper and lower two scanning lines 31U and 31L, a change in potential DS on the power source supply line 32, and changes in gate potential Vg and source potential Vs of the drive transistor 22 for 1F (F is a time period for field/frame).

It is to be noted that concrete operations of a preparation for a threshold correction, a threshold correction, a signal write and mobility correction, and a light emission in each of the four kinds of sub-pixels 20W, 20R, 20G and 20B are basically the same as those in the case of the circuit operation of the organic EL display device 10A of the reference example previously described.

In the non-light emission state, each of the potentials WSU and WSL of the scanning lines 31U and 31L belonging to the upper and lower two rows transits from a lower potential side to a higher potential side at a time t11. The time t11 corresponds to the time t2 in the timing waveform chart of FIG. 4. At this time, the potential on the signal line 33 is in the offset voltage Vofs state, and thus the offset voltage Vofs is written to the gate electrode of the drive transistor 22 by the write transistor 23 in each of the sub-pixels 20W and 20B, and 20R and 20G belonging to the upper and lower two rows, respectively.

Next, the potential DS on the power source supply line 32 is switched from the low potential Vini to the high potential Vccp at a time t12, thereby starting the threshold correcting operation in each of the sub-pixels 20W and 20B, and 20R and 20G belonging to the upper and lower two rows, respectively. The time t12 corresponds to the time t3 in the timing waveform chart of FIG. 4. The threshold correcting operation is performed for a time period (a time period for a threshold correction) from the time t12 to a time t13 at which each of the potentials WSU and WSL on the scanning lines 31U and 31L transits from the higher potential side to the lower potential side.

Next, the signal voltage Vsig of the video signal for the upper row is supplied from the horizontal driving circuit 60 to the signal line 33 at a time t14. Subsequently, the potential WSU on the scanning line 31U belonging to the upper row transits from the lower potential side to the high potential side again at a time t15. As a result, the signal voltage Vsig of the video signal is written to the gate electrode of the drive transistor 22 by the write transistor 23 in each of the sub-pixels 20W and 20B belonging to the upper row. The times t14 and t15 correspond to the times t5 and t6 in the timing waveform chart of FIG. 4, respectively.

Next, at a time t16, the potential WSU on the scanning line 31U belonging to the upper row transits from the higher potential side to the lower potential side. Also, the signal voltage Vsig of the video signal for the lower row is supplied from the horizontal drive circuit 60 to the signal line 33. Subsequently, the potential WSL on the scanning line 31L belonging to the lower row transits from the lower potential side to the higher potential side again at a time t17. As a result, the signal voltage Vsig of the video signal is written to the gate electrode of the drive transistor 22 by the write transistor 23 in each of the sub-pixels 20R and 20G belonging to the lower row. Also, the potential WSL on the scanning line 31L belonging to the lower row transits from the higher potential side to the lower potential side at a time t18, so that the operation enters the time period for light emission.

As apparent from the description about the series of operations described above, in the case where one power source supply line 32 is wired every two rows, and the power source potential DS (Vccp/Vini) supplied from the power source supply scanning circuit 50 through the power source supply line 32 concerned to control the time period for light emission of the organic EL element 21 is made common to the four kinds of sub-pixels 20W, 20R, 20G and 20B of the same unit pixel 20*b*, the time period for a threshold depending on the timing of transition of the power source potential DS from the lower potential Vini to the higher potential Vccp in each of the sub-pixels 20W and 20B belonging to the upper row becomes identical to that in each of the sub-pixels 20R and 20G belonging to the lower row. Even when being simultaneously performed in the upper and lower rows, the threshold correcting operation does not become a problem at all in terms of the circuit operation.

On the other hand, the operation for a signal write and mobility correction is performed with a fixed time period (t16 to t17), for example, with a time lag of several microseconds between each of the sub-pixels 20W and 20B belonging to the upper row, and each of the sub-pixels 20R and 20G belonging to the lower row for a time period for 1H containing a time period for a threshold correction. Although a difference in time period for light emission occurs between each of the sub-pixels 20W and 20B belonging to the upper row, and each of the sub-pixels 20R and 20G belonging to the lower row, it does not become a problem at all because its value is several microseconds and thus is at a level which cannot be visualized as an emission luminance difference.

In addition, the operation for a signal write and mobility correction is performed by shifting a time between each of the sub-pixels 20W and 20B belonging to the upper row, and each of the sub-pixels 20R and 20G belonging to the lower row within the time period for 1H, which results in that the scanning cycle for the vertical scanning may be the same 1H cycle as that in the case where the number of rows is m. As a result, as previously stated, the number of stages of the shift registers constituting the write scanning circuit 40 for generating the write scanning signal can be set as the m stages corresponding to a half of the number, j, of rows (j=2m).

Also, the j write scanning signals the number of which is double the number of m write scanning signals have to be generated in the logic circuit in the subsequent stage of the shift registers based on the m write scanning signals outputted from the shift registers of the m stages. More specifically, in the logic circuit, for example, the write scanning signals outputted from the shift registers have to be used as the write scanning signals for the upper row. On the other hand, the write scanning signals which delay by the above fixed time with respect to the write scanning signals for the upper row have to be generated based on the write scanning signals for the upper row to be used as the write scanning signals for the lower row.

(Working Effects of Embodiment)

As set forth hereinabove, in the active matrix type organic EL display device 10B adopting the pixel configuration that the unit pixel 20*b* is composed of the four kinds of adjacent sub-pixels 20W and 20B, and 20R and 20G belonging to a plurality of rows, for example, the upper and lower two rows, respectively, and the drive transistor 22 is given the function of controlling the time period for light emission and the time period for non-light emission of the organic EL element 21, one power source supply line 32 (corresponding one of 33-1 to 33-*m*) is made common to the four kinds of sub-pixels 20W and 20B, and 20R and 20G constituting the same unit pixel 20*b* and belonging to the upper and lower rows, respectively. As a result, the circuit configuration having the m stages is maintained as it is in terms of the shift registers of the write scanning circuit 40, and the power source supply scanning circuit 50. Therefore, it is possible to narrow the screen frame of the display panel 70 because the circuit scale of the write scanning circuit 40 can be reduced.

In addition, one power source supply line 32 (corresponding one of 33-1 to 33-*m*) is made common to the four kinds of sub-pixels 20W and 20B, and 20R and 20G constituting the same unit pixel 20*b* and belonging to the upper and lower rows, respectively. As a result, the number of constituent elements of the pixel circuit can be increased all the more because it is possible to sufficiently obtain the individual areas of the sub-pixels 20W, 20R, 20G and 20B. In addition, it is possible to realize the promotion of the high definition for the display panel 70 because the individual sizes of the sub-pixels 20W, 20R, 20G and 20B can be miniaturized.

[Example of Change]

Although the embodiment of the present invention has been described so far by giving the case where an embodiment of the present invention is applied to the organic EL display device using the organic EL elements as the electro-optic elements for the four kinds of sub-pixels 20W, 20R, 20G and 20B, the present invention is by no means limited thereto. That is to say, the present invention can be generally applied to the flat panel type display device in which unit pixels each being composed of a plurality of sub-pixels belonging to a plurality of rows are two-dimensionally disposed in a matrix.

[Examples of Application]

The display devices, described above, according to an embodiment of the present invention can be applied to display devices, of electronic apparatuses in all the fields, in each of which a video signal inputted to the electronic apparatus, or a video signal generated in the electronic apparatus is displayed in the form of an image or a video image. These electronic apparatuses are typified by various electronic apparatus, shown in FIG. 14 to 18G, such as a digital camera, a notebook-size personal computer, mobile terminal equipment such as a mobile phone, and a video camera.

As has been just described, the display device according to an embodiment of the present invention is used as each of the display devices of the electronic apparatuses in all the fields, which results in that as apparent from the description about the embodiment described above, in the display device according to an embodiment of the present invention, the narrowing of the screen frame, and the promoting of the high definition can be realized for the display panel 70. Therefore, the present invention can contribute to the miniaturization of the apparatus main body in each of the various kinds of electronic apparatuses, and can realize the image display having the high definition.

It is to be noted that the display device according to the present invention also includes one having a module shape having a sealed structure. For example, a display module stuck to a counter portion made of a transparent glass or the like in the pixel array portion 30 corresponds to the display device having the module shape. A color filter, a protective film, etc., and moreover the light shielding film described above may also be formed on this transparent counter portion. It is to be noted that the display module may be provided with a circuit portion for receiving/outputting a signal or the like from/to the outside, a flexible printed circuit (FPC), and the like.

Hereinafter, concrete examples of electronic apparatuses to each of which an embodiment of the present invention is applied will be described.

Figure 14:
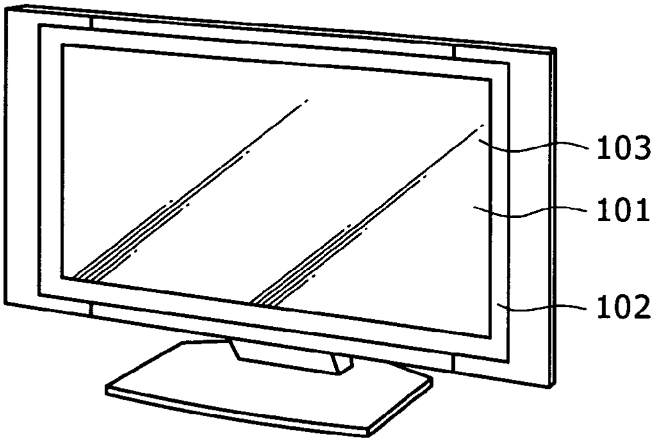
FIG. 14 is a perspective view showing an outer appearance of a television set as an application example to which an embodiment of the present invention is applied.

FIG. 14 is a perspective view showing a television set to which an embodiment of the present invention is applied. The television set according to this example of application includes an image display screen portion 101 composed of a front panel 102, a filter glass 103, and the like. Also, the television set is manufactured by using the display device according to an embodiment of the present invention as the image display screen portion 101.

Figure 15A:
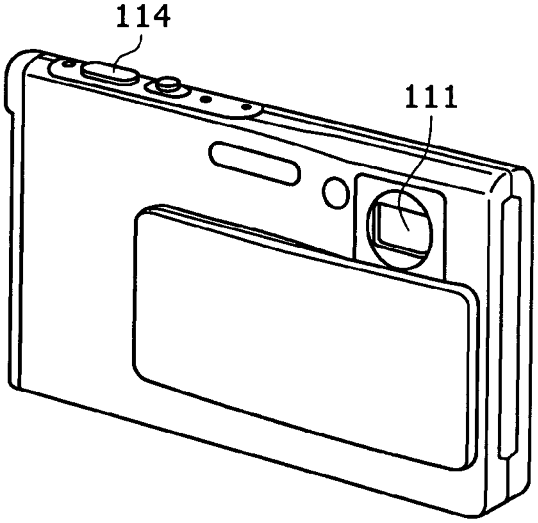
FIGS. 15A and 15B are respectively a perspective view showing an outer appearance of a digital camera as another application example, when viewed from a front side, to which an embodiment of the present invention is applied, and a perspective view showing an outer appearance of the digital camera as the another application example, when viewed from a back side, to which an embodiment of the present invention is applied.
Figure 15B:
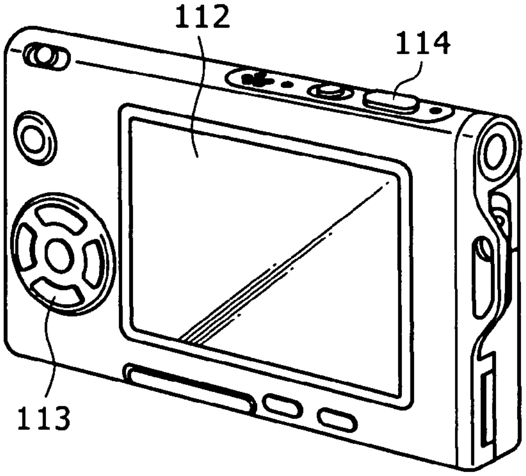

FIGS. 15A and 15B are respectively perspective views showing an outer appearance of a digital camera to which an embodiment of the present invention is applied. FIG. 15A is a perspective view when the digital camera is viewed from a front side, and FIG. 15B is a perspective view when the digital camera is viewed from a back side. The digital camera according to this example of application includes a light emitting portion 111 for flash, a display portion 112, a menu switch 113, a shutter button 114, and the like. The digital camera is manufactured by using the display device according to an embodiment of the present invention as the display portion 112.

Figure 16:
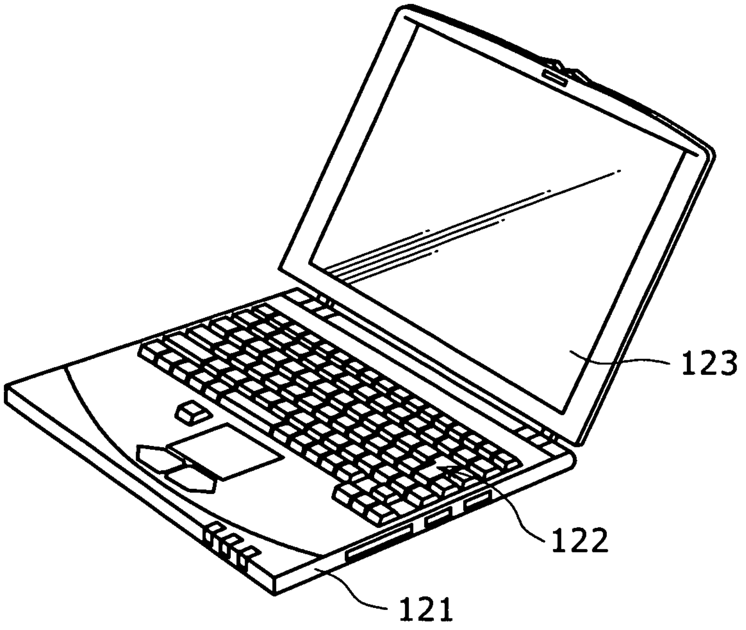
FIG. 16 is a perspective view showing an outer appearance of a notebook-size personal computer as still another application example to which an embodiment of the present invention is applied.

FIG. 16 is a perspective view showing an outer appearance of a notebook-size personal computer to which an embodiment of the present invention is applied. The notebook-size personal computer according to this example of application includes a main body 121, a keyboard 122 which is manipulated when characters or the like are inputted, a display portion 123 for displaying an image, and the like. The notebook-size personal computer is manufactured by using the display device according to an embodiment of the present invention as the display portion 123.

Figure 17:
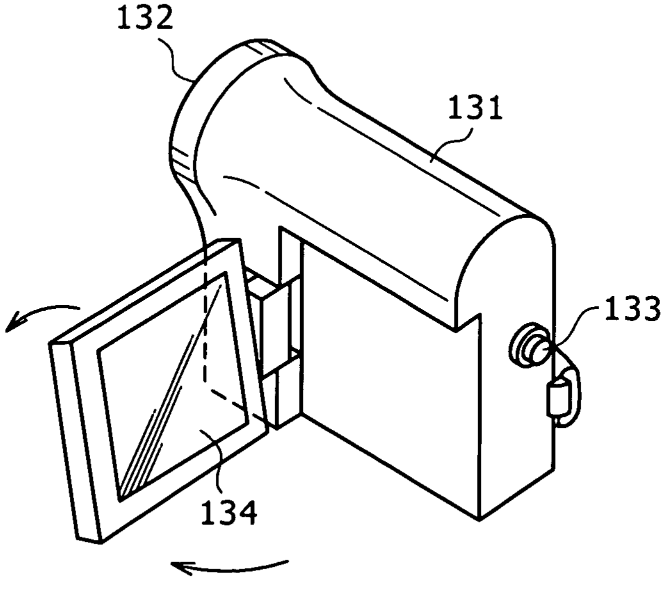
FIG. 17 is a perspective view showing an outer appearance of a video camera, as yet another application example, to which an embodiment of the present invention is applied.

FIG. 17 is a perspective view showing an outer appearance of a video camera to which an embodiment of the present invention is applied. The video camera according to this example of application includes a main body portion 131, a lens 132 which captures an image of a subject and which is provided on a side surface directed forward, a start/stop switch 133 which is manipulated when an image of a subject is captured, a display portion 134, and the like. The video camera is manufactured by using the display device according to an embodiment of the present invention as the display portion 134.

Figure 18A:
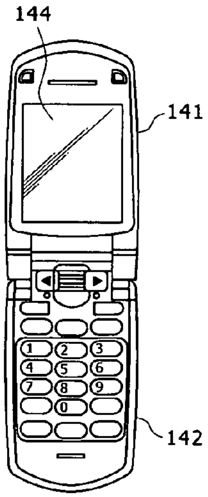
FIGS. 18A to 18G are respectively a front view of a mobile phone as a further application example, in an open state, to which an embodiment of the present invention is applied, a side elevational view thereof, a front view thereof in a close state, a left side elevational view thereof, a right side elevational view thereof, a top plan view thereof, and a bottom view thereof.
Figure 18B:
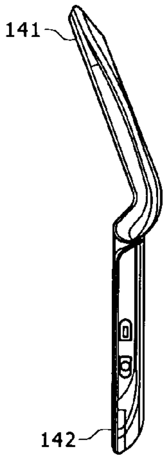
Figure 18F:
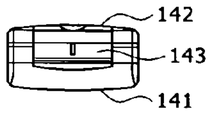
Figure 18D:
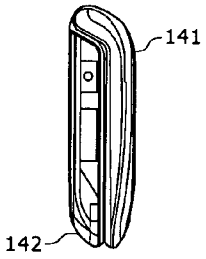
Figure 18C:
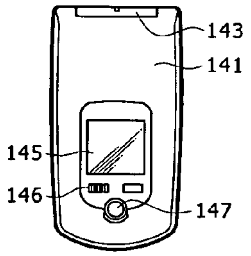
Figure 18E:
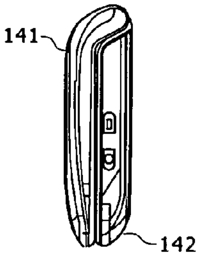
Figure 18G:
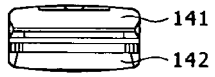
Figure 19:
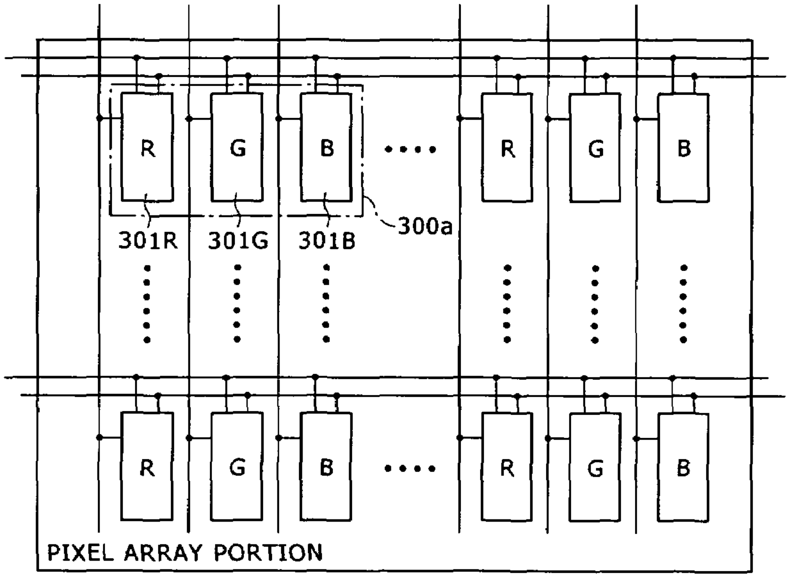
FIG. 19 is a system configuration diagram showing a color display device having a unit pixel composed of adjacent sub-pixels corresponding to the three primary colors of R, G and B, respectively, and belonging to the same row.
Figure 20:
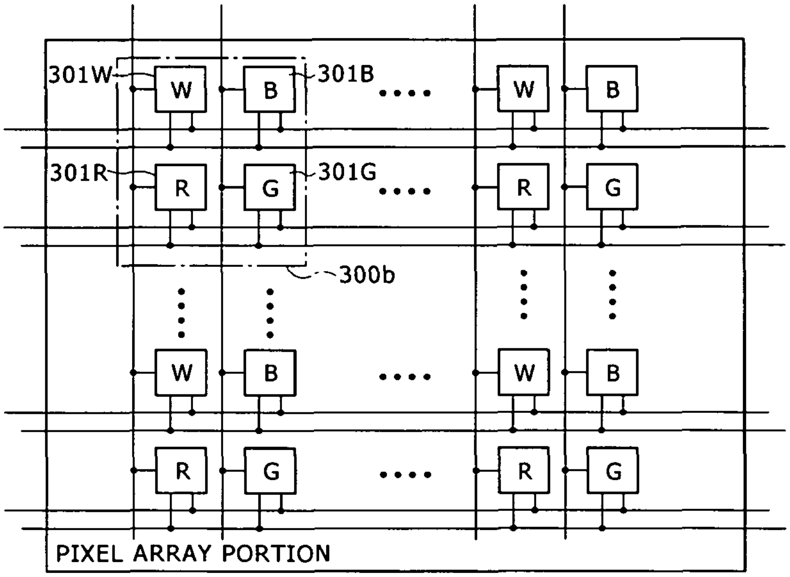
FIG. 20 is a system configuration diagram showing a color display device having a unit pixel composed of four kinds of adjacent sub-pixels corresponding to the colors of W, R, G and B, respectively, and belonging to upper and lower two rows.

FIGS. 18A to 18G are respectively views each showing an outer appearance of mobile terminal equipment, for example, a mobile phone to which an embodiment of the present invention is applied. FIG. 18A is a front view in an open state of the mobile phone, FIG. 18B is a side view in the open state of the mobile phone, FIG. 18C is a front view in a close state of the mobile phone, FIG. 18D is a left view in a close state of the mobile phone, FIG. 18E is a right side view of the mobile phone, FIG. 18F is a top view of the mobile phone, and FIG. 18G is a bottom view of the mobile phone. The mobile phone according to this example of application includes an upper chassis 141, a lower chassis 142, a connection portion (a hinge portion in this case) 143, a display portion 144, a sub-display portion 145, a picture light 146, a camera 147, and the like. The mobile phone is manufactured by using the display device according to an embodiment of the present invention as the display portion 144 or the sub-display portion 145.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array portion in which a plurality of sub-pixels are disposed in a matrix comprising rows and columns of sub-pixels, each sub-pixel including an electro-optic element, a write transistor for writing a video signal, a hold capacitor for holding the video signal written by said write transistor, and a drive transistor for driving said electro-optic element in accordance with the video signal held in said hold capacitor;

a plurality of unit pixels, each unit pixel comprising a plurality of sub-pixels that are adjacent to each other, wherein the sub-pixels of each unit pixel belong to at least two rows of the matrix of sub-pixels;

a plurality of power source supply lines through which power source potentials different in potential from one another are selectively supplied to said drive transistors;

wherein one power source supply line is wired every other row, such that:

each power source supply line is disposed between adjacent rows of sub-pixels, and the sub-pixels of both of the adjacent rows between which a given power source supply line is disposed are electrically connected to that given power source supply line and to no other power source supply line;

wherein the display device is configured to perform a threshold correcting operation for each sub-pixel for correcting a dispersion of threshold voltages of the drive transistors of the sub-pixels; and wherein the threshold correcting operation is performed for all of the sub-pixels of a given unit pixel simultaneously, each sub-pixel is adapted to perform a mobility correcting operation for correcting a dispersion of mobilities of the drive transistors of the sub-pixels, an operation for writing the video signal by said write transistor is performed sequentially, with a time lag between each respective operation, for each of the sub-pixels that constitute the given unit pixel and that are in a same column, and all of the operations for writing the video signals for the sub-pixels that constitute the given unit pixel and that are in the same column are performed within a same horizontal time period, and the mobility correcting operation is performed sequentially, with a time lag between each respective operation, for each of the sub-pixels that constitute the given unit pixel and that are in the same column, and all of the mobility correcting operations for the sub-pixels that constitute the given unit pixel and that are in the same column are performed within the same horizontal time period.

2. The display device according to claim 1, wherein the write transistors, the hold capacitors, and the drive transistors of the sub-pixels of the rows between which a given power source supply line is disposed are vertically, symmetrically disposed with respect to the given power source supply line.

3. An electronic apparatus comprising:

the display device of claim 1.

4. The electronic apparatus according to claim 3, wherein the write transistors, the hold capacitors, and the drive transistors of the sub-pixels of the rows between which a given power source supply line is disposed are vertically, symmetrically disposed with respect to the given power source supply line.

5. The electronic apparatus according to claim 3, wherein the threshold correcting operations and the mobility correcting operations for all of the sub-pixels of the given unit pixel are completed in the same horizontal time period.

6. The electronic apparatus according to claim 3, wherein each unit pixel comprises a white sub-pixel, a red sub-pixel, a green sub-pixel, and a blue sub-pixel.

7. The display device according to claim 1, wherein the threshold correcting operations and the mobility correcting operations for all of the sub-pixels of the given unit pixel are completed in the same horizontal time period.

8. The display device according to claim 1, wherein each unit pixel comprises a white sub-pixel, a red sub-pixel, a green sub-pixel, and a blue sub-pixel.

* * * * *